US007979542B2

(12) United States Patent
Strohwig et al.

(10) Patent No.: US 7,979,542 B2
(45) Date of Patent: *Jul. 12, 2011

(54) METHODS AND SYSTEMS FOR TRANSACTION RECORD DELIVERY USING THRESHOLDS AND MULTI-STAGE PROTOCOL

(75) Inventors: Marc E. Strohwig, Danville, CA (US); John M. McGinty, Fremont, CA (US); W. Olin Sibert, Lexington, MA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 12/403,319

(22) Filed: Mar. 12, 2009

(65) Prior Publication Data
US 2009/0228597 A1 Sep. 10, 2009

Related U.S. Application Data

(60) Continuation of application No. 10/942,532, filed on Sep. 15, 2004, now Pat. No. 7,523,194, which is a division of application No. 09/629,114, filed on Jul. 31, 2000, now Pat. No. 6,950,867.

(60) Provisional application No. 60/146,593, filed on Jul. 30, 1999.

(51) Int. Cl.
*G06F 15/16* (2006.01)
*G06F 15/173* (2006.01)
(52) U.S. Cl. ........ 709/224; 709/223; 709/227; 709/228; 709/229
(58) Field of Classification Search .................. 709/217, 709/224; 714/4, 815; 370/507, 328, 324, 370/222, 218
See application file for complete search history.

(56) References Cited

U.S. PATENT DOCUMENTS
4,264,782 A 4/1981 Konheim
(Continued)

FOREIGN PATENT DOCUMENTS
AU A-36815/97 2/1998
(Continued)

OTHER PUBLICATIONS

"Frequently Asked Questions About Auction Types," available online at http://www.pages.ebay.com/help/basics/f-format.html, first viewed on Sep. 1, 1999, 3 pages.
(Continued)

*Primary Examiner* — Quang N. Nguyen
(74) *Attorney, Agent, or Firm* — Finnegan, Henderson, Farabow, Garrett & Dunner, LLP

(57) ABSTRACT

The present invention provides systems and methods for conducting electronic transactions in a distributed computing environment. A communications protocol is provided that enables reliable transactional state synchronization for peers participating in a distributed transaction. A transaction processing application is deployed on a local computer system to manage transactions thereon. The local computer system contacts a remote computer system to obtain authorization to execute a transaction. The local computer system initiates a failure-recovery job that is operable to automatically resend status signals and other information to the remote system if the communication with the remote system exhibits certain predefined fault conditions. The remote system is able to dynamically adjust the definition of the predefined fault conditions. If the transaction concludes without triggering the predefined fault conditions, the failure-recovery job is cancelled. The transaction processing application may also allow deferred transactions between remote parties. The transaction processing application maintains a record of the transactions performed by the consumer on the consumer's local system. Upon the occurrence of predefined conditions, transactional records are sent to a remote vendor or clearinghouse. The vendor or clearinghouse can manage the risk it bears by setting the predefined conditions appropriately.

10 Claims, 14 Drawing Sheets

U.S. PATENT DOCUMENTS

| | | | |
|---|---|---|---|
| 4,672,572 A | | 6/1987 | Alsberg |
| 4,799,156 A | | 1/1989 | Shavit et al. |
| 4,823,264 A | | 4/1989 | Deming |
| 4,827,508 A | | 5/1989 | Shear |
| 4,930,073 A | | 5/1990 | Cina, Jr. |
| 5,042,083 A | | 8/1991 | Ichikawa |
| 5,103,476 A | | 4/1992 | Waite et al. |
| 5,111,390 A | | 5/1992 | Ketcham et al. |
| 5,224,163 A | | 6/1993 | Gasser et al. |
| 5,319,705 A | | 6/1994 | Halter et al. |
| 5,343,527 A | | 8/1994 | Moore |
| 5,390,330 A | | 2/1995 | Talati |
| 5,396,613 A | * | 3/1995 | Hollaar ............................ 714/4 |
| 5,428,645 A | * | 6/1995 | Dolev et al. .................. 370/507 |
| 5,491,800 A | | 2/1996 | Goldsmith et al. |
| 5,511,164 A | | 4/1996 | Brunmeier et al. |
| 5,530,235 A | | 6/1996 | Stefik et al. |
| 5,534,975 A | | 7/1996 | Stefik et al. |
| 5,537,539 A | | 7/1996 | Narihiro |
| 5,550,873 A | * | 8/1996 | Dolev et al. .................. 370/507 |
| 5,586,130 A | * | 12/1996 | Doyle ........................... 714/815 |
| 5,604,487 A | * | 2/1997 | Frymier ........................ 709/217 |
| 5,629,980 A | | 5/1997 | Stefik et al. |
| 5,634,012 A | | 5/1997 | Stefik et al. |
| 5,638,443 A | | 6/1997 | Stefik et al. |
| 5,640,546 A | | 6/1997 | Gopinath et al. |
| 5,692,047 A | | 11/1997 | McManis |
| 5,715,403 A | | 2/1998 | Stefik |
| 5,745,678 A | | 4/1998 | Herzberg et al. |
| 5,748,960 A | | 5/1998 | Fischer |
| 5,757,914 A | | 5/1998 | McManis |
| 5,784,421 A | * | 7/1998 | Dolev et al. .................. 370/324 |
| 5,797,127 A | | 8/1998 | Walker et al. |
| 5,835,896 A | | 11/1998 | Fisher et al. |
| 5,878,405 A | | 3/1999 | Grant et al. |
| 5,890,138 A | | 3/1999 | Godin et al. |
| 5,892,900 A | | 4/1999 | Ginter et al. |
| 5,897,620 A | | 4/1999 | Walker et al. |
| 5,905,975 A | | 5/1999 | Ausubel |
| 5,910,987 A | | 6/1999 | Ginter et al. |
| 5,915,019 A | | 6/1999 | Ginter et al. |
| 5,920,861 A | | 7/1999 | Hall et al. |
| 5,923,643 A | * | 7/1999 | Higgins et al. ................ 370/218 |
| 5,926,796 A | | 7/1999 | Walker et al. |
| 5,940,504 A | | 8/1999 | Griswold |
| 5,943,422 A | | 8/1999 | Van Wie et al. |
| 5,984,178 A | * | 11/1999 | Gill et al. ..................... 340/5.41 |
| 5,999,622 A | | 12/1999 | Yasukawa et al. |
| 6,112,181 A | | 8/2000 | Shear et al. |
| 6,128,305 A | | 10/2000 | Hjatmtysson et al. |
| 6,147,967 A | * | 11/2000 | Ying et al. .................... 370/222 |
| 6,157,721 A | | 12/2000 | Shear et al. |
| 6,185,197 B1 | * | 2/2001 | Cheung Yeung et al. ..... 370/328 |
| 6,185,683 B1 | | 2/2001 | Ginter et al. |
| 6,226,618 B1 | | 5/2001 | Downs et al. |
| 6,263,313 B1 | | 7/2001 | Milsted et al. |
| 6,363,488 B1 | | 3/2002 | Ginter et al. |
| 6,389,538 B1 | | 5/2002 | Gruse et al. |
| 6,389,541 B1 | | 5/2002 | Patterson |
| 6,418,421 B1 | | 7/2002 | Hurtado et al. |
| 6,453,297 B1 | | 9/2002 | Burks et al. |
| 6,587,837 B1 | | 7/2003 | Spagna et al. |
| 6,640,304 B2 | | 10/2003 | Ginter et al. |
| 6,668,325 B1 | | 12/2003 | Collberg et al. |
| 7,318,045 B2 | | 1/2008 | Baecker et al. |
| 2001/0042043 A1 | | 11/2001 | Shear et al. |

FOREIGN PATENT DOCUMENTS

| | | |
|---|---|---|
| AU | A-36816/97 | 2/1998 |
| AU | A-36840/97 | 2/1998 |
| CA | 2220832 | 4/1999 |
| EP | 0037762 B2 | 2/1984 |
| EP | 0 128 672 A1 | 12/1984 |
| EP | 0 325 777 A2 | 2/1989 |
| EP | 0 399 822 A2 | 11/1990 |
| EP | 0 421 409 A2 | 4/1991 |
| EP | 0 565 314 B1 | 10/1993 |
| EP | 0647055 A1 | 4/1995 |
| EP | 0 715 243 A1 | 6/1996 |
| EP | 0 715 244 A1 | 6/1996 |
| EP | 0 715 245 A1 | 6/1996 |
| EP | 0 715 246 A1 | 6/1996 |
| EP | 0 715 247 A1 | 6/1996 |
| EP | 0777363 A2 | 6/1997 |
| EP | 0794651 A1 | 9/1997 |
| EP | 0872984 A1 | 10/1998 |
| EP | 0 913 757 A2 | 5/1999 |
| FR | 2737067 | 1/1997 |
| GB | 2 264 796 A | 9/2003 |
| WO | WO 90/02382 | 3/1990 |
| WO | WO 92/22870 | 12/1992 |
| WO | WO 93/01550 | 1/1993 |
| WO | WO 94/03859 | 2/1994 |
| WO | WO 94/06103 | 3/1994 |
| WO | WO 96/27155 | 9/1996 |
| WO | WO 97/43761 | 11/1997 |
| WO | WO 98/09209 | 3/1998 |
| WO | WO 98/10381 | 3/1998 |
| WO | WO 98/37481 | 8/1998 |
| WO | WO 98/45768 | 10/1998 |
| WO | WO 99/01815 | 1/1999 |
| WO | WO 99/24928 | 5/1999 |
| WO | WO 99/48296 | 9/1999 |
| WO | WO 00/08909 A2 | 2/2000 |
| WO | WO 01/06374 | 1/2001 |

OTHER PUBLICATIONS

"Microsoft Site Server 3.0, Commerce Edition, Online Auctions," Microsoft Corporation, 1998, pp. 1-33.

"Microsoft® Authenticode™ Technology, Ensuring Accountability and Authenticity for Software Components on the Internet," Microsoft Corporation, Oct. 1996, 5 introductory pages and pp. 1-10.

Berkovits, S. et al., "Authentication of Mobile Agents," *Lecture Notes in Computer Science*, vol. 1419: Mobile Agents and Security, G. Vigna, Ed., Springer-Verlag, 1998, pp. 114-136.

Blaze, M. et al., "Decentralized Trust Management," Proceedings IEEE Conference on Security and Privacy, May 1996, pp. 164-173.

Borodin, A. et al., Online Computation and Competitive Analysis, Cambridge University Press, 1998.

Chess, D., "Security Issues in Mobile Code Systems," *Lecture Notes in Computer Science*, vol. 1419: Mobile Agents and Security, G. Vigna, Ed., Springer-Verlag, 1998, pp. 1-14.

European Search Report for Application No. 05001746.6, dated Jun. 1, 2005, 2 pages.

European Search Report for Application No. 05001745.8, dated Jun. 1, 2005, 2 pages.

Gong, L. et al., "Signing, Sealing and Guarding Java™ Objects," *Lecture Notes in Computer Science*, vol. 1419: Mobile Agents and Security, G. Vigna, Ed., Springer-Verlag, 1998, pp. 206-216.

Hohl, F., "Time Limited Blackbox Security: Protecting Mobile Agents From Malicious Hosts," Institute of Parallel and Distributed High-Performance Systems (IPVR), University of Stuttgart, Germany, 1998, pp. 92-113.

Network Working Group Rfc 2693—"Spki Certificate Theory," available at http://www.ietf.org/rfc/rfc2693.txt?number=2693, Sep. 1999, 41 pages.

Sairamesh, J. et al., "Economic Framework for Pricing and Charging in Digital Libraries," *D-Lib Magazine*, ISSN 1082-9873, Feb. 1996, 11 pages.

Sander, T. et al., "Protecting Mobile Agents Against Malicious Hosts," *Lecture Notes in Computer Science*, vol. 1419: Mobile Agents and Security, G. Vigna, Ed., Springer-Verlag, Feb. 1998, 16 pages.

Sander, T. et al., "Towards Mobile Cryptography," *International Computer Science Institute*, Berkeley, CA, TR-97-049, Nov. 22, 1997, cover page and pp. 1-14.

Sibert, Olin et al., "DigiBox: A Self-Protecting Container for Information Commerce," Proceedings of the First USENIX Workshop on Electronic Commerce, New York, NY, Jul. 1995, 9 pages.

Sibert, Olin et al., "Securing the Content, Not the Wire, for Information Commerce," InterTrust Technologies Corporation, 1996, 12 pages.

Stefik, M. "Trusted Systems," Scientific American, Mar. 1997, pp. 8-81.

Stefik, M., "Introduction to Knowledge Systems," Chapter 7, Classification, Morgan Kaufmann Publishers, Inc., San Francisco, CA, 1995, 3 introductory pages and pp. 543-607.

Stefik, M., "Letting Loose the Light: Igniting Commerce in Electronic Publication," Internet Dreams: Archetypes, Myths, and Metaphors, Massachusetts Institute of Technology, 1996, 5 introductory pages and pp. 219-253.

Stefik, M., "Letting Loose the Light: Igniting Commerce in Electronic Publication," Xerox Parc, Palo Alto, CA, 1994-1995, cover pages and 35 pages.

Varian, H., "Buying, Sharing and Renting Information Goods," University of California at Berkeley, Dec. 1994, current version: Aug. 5, 2000, cover page and pp. 1-19.

Varian, H., "Economic Mechanism Design for Computerized Agents," School of Information Management and Systems, University of California at Berkeley, originally published in the Proceedings of the First USENIX Workshop on Electronic Commerce, Jul. 1995, 10 pages.

Varian, H., "Pricing Electronic Journals," *D-Lib Magazine*, ISSN 1082-9873, Jun. 1996, 3 pages.

Varian, H., "Pricing Information Goods," University of Michigan, Jun. 15, 1995, cover page and pp. 1-7.

White, S. et al., "Abyss: A Trusted Architecture for Software Protection," IEEE Computer Society Conference on Security and Privacy, 1987, pp. 38-51.

Office Action mailed Nov. 21, 2003 for related U.S. Appl. No. 09/629,114, filed Jul. 31, 2000.

Notice of Allowance mailed Jul. 26, 2004 for related U.S. Appl. No. 09/629,114, filed Jul. 31, 2000.

Notice of Allowance mailed Dec. 11, 2008 for related U.S. Appl. No. 10/942,532, filed Sep. 15, 2004.

International Search Report mailed Mar. 15, 2001 for International Application No. PCT/US2000/020737, filed Jul. 31, 2000.

International Preliminary Examination Report mailed Nov. 21, 2001 for International Application No. PCT/US2000/020737, filed Jul. 31, 2000.

English translation of Notice of Opposition by Societe Francaise Du Radiotelephone dated Jun. 28, 2006 filed in European Patent No. EP1204913.

Stevens, W., TCP/IP Illustrated, vol. 1, the Protocols, Excerpts from chapters 2, 17, and 20, 16 pages, Jan. 1999.

Postel, J., RFC 793: Transmission Control Protocol, 35 pages, Sep. 1981.

ETSI TS 100 929 V8.1.0, Digital Cellular Telecommunications System (Phase 2+); security related network functions, pp. 1-97, Jul. 2001.

ETSI 300 901, Digital Cellular Telecommunications System (Phase 2+); technical realization of the short message service (SMS); point-to-point (PP), pp. 1-113, Dec. 1998.

3GPP TS 03.48 V8.8.0, 3rd Generation Partnership Project; Technical Specification Group Terminals; Security Mechanisms for the SIM application toolkit; Stage 2, pp. 1-33, Dec. 2001.

GSM 03.01, Digital Cellular Telecommunications System (Phase 2+); Network functions, pp. 1-18, Jun. 1996.

Draft TS 100 960 V5.0.0, Digital Cellular Telecommunications System (Phase 2+); General Packet Radio Service (GPRS); GPRS Tunnelling Protocol (GTP); Acros the Gp and Gn Interface, pp. 1-55, Dec. 1997.

Notice of Opposition by F.R. Kelly & Co. dated Jul. 5, 2006 filed in European Patent No. EP1204913.

Examination Report dated Apr. 12, 2006 issued in European Application No. 05001745.8.

Decision to Refuse a European Patent Application dated Mar. 2, 2007 issued in European Application No. 05001745.8.

Examination Report dated Apr. 12, 2006 issued in European Application No. 05001746.6.

Decision to Refuse a European Patent Application dated Mar. 2, 2007 issued in European Application No. 05001746.6.

* cited by examiner

METHODS AND SYSTEMS FOR TRANSACTION RECORD DELIVERY USING THRESHOLDS AND MULTI-STAGE PROTOCOL

RELATED APPLICATIONS

This application is a continuation application of U.S. application Ser. No. 10/942,532, filed Sep. 15, 2004 (now U.S. Pat. No. 7,523,194, issued Apr. 21, 2009), which is a division of U.S. application Ser. No. 09/629,114, filed Jul. 31, 2000 (now U.S. Pat. No. 6,950,867, issued Sep. 27, 2005), which claims the benefit of priority of U.S. Provisional Patent Application No. 60/146,593, filed Jul. 30, 1999. These applications are hereby incorporated by reference into this application in their entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to systems and methods for electronic communication. More specifically, the present invention relates to systems and methods for managing communications between computer systems involved in a transaction.

BACKGROUND OF THE INVENTION

Recent advances in computing and networking technology have enabled a variety of new types of commercial transactions between physically remote parties. For example, many vendors operate Internet web sites at which consumers can purchase the vendor's goods using a credit card or other form of payment. The goods are shipped to the consumer after the payment is received. One class of transactions that is growing in importance involves the sale of digital goods, such as digitally-recorded songs, movies, images, books, reports, and the like. The nature of digital goods allows them to be transported over a computer network with relative ease, and/or stored on readily-available and inexpensive storage media, such as diskettes, compact discs (CDs), and the like. Thus, transactions involving digital goods are able to occur virtually instantaneously, as digital goods can be transmitted over the network from the vendor's computer system to the purchaser's computer system in little time.

In other types of transactions, a copy of a digital work might already reside on the consumer's computer system at the time the consumer wishes to purchase it. For example, the consumer may have obtained a copy from a friend, downloaded a copy from the Internet, or obtained a copy by some other means. The content may be encrypted or otherwise packaged so that it cannot be accessed without payment, and the consumer may thus need to contact the content owner or the owner's agent in order to gain access. For example, the consumer may provide the content owner with a credit card payment in exchange for a cryptographic key or other means of unpackaging the content.

There is also an increasing demand for even more flexible business arrangements. For example, a content vendor may wish to allow consumers to purchase content on a pay-per-use basis, and/or may wish to allow consumers to pay for content in a non-traditional manner—such as by allowing the vendor to collect information regarding the consumer's content-usage habits. To facilitate arrangements such as these, a content vendor may provide the consumer with a special rights-management application program that runs on the consumer's computer system and enforces the terms of the consumer's contract with the vendor.

A problem that arises in distributed electronic transactions such as those described above is that of managing the risk borne by content creators and distributors when their content is used by, or distributed to, consumers. For example, content owners will typically wish to prevent consumers from stealing their content and distributing it to others, and will also wish to prevent consumers from circumventing the technical mechanisms by which transactions are conducted and enforced. However, it is desirable to manage this risk in a manner that does not unduly compromise the consumer's content-usage experience, as the more difficult it is for a consumer to access and use electronic content, the less likely it is that the consumer will use it, and thus anti-piracy measures intended to prevent a loss of revenue to the content provider can have the opposite effect. Systems and methods are thus needed for enabling content providers to manage risk flexibly and efficiently, in a manner that accounts for and reduces the impact that risk management decisions have on the end user's experience, and thus on the overall desirability and distribution of the content.

SUMMARY OF THE INVENTION

The present invention provides systems and methods for enabling content owners to conduct electronic transactions efficiently, securely, and in a manner that allows individual content owners to make nuanced decisions about the level of risk which they are willing to bear in a given transaction. In one set of embodiments, a communications protocol is disclosed, as are systems and methods for using this protocol to manage communication between sites involved in an electronic transaction. In another set of embodiments, a threshold mechanism is disclosed for enabling offline transactions and for managing the level of exposure borne by the content vendor when conducting the same. It should be appreciated that the present invention can be implemented in numerous ways, including as a process, an apparatus, a system, a device, a method, a computer readable medium, or as a combination thereof. Several inventive embodiments of the present invention are described below.

In one embodiment, a communications protocol is provided that enables reliable transactional state synchronization for peers participating in a distributed transaction. A transaction processing application is deployed on a local computer system to manage transactions thereon. The local computer system contacts a remote computer system to obtain authorization to execute a transaction. The local computer system initiates a failure-recovery job that is operable to automatically resend status signals and other information to the remote system if the communication with the remote system exhibits certain predefined fault conditions. The remote system is able to adjust the definition of the predefined fault conditions. If the transaction concludes without triggering the predefined fault conditions, the failure-recovery job is cancelled. The transaction processing application may also allow deferred transactions between remote parties. The transaction processing application maintains a record of the transactions performed by the consumer on the consumer's local system. Upon the occurrence of predefined conditions, transactional records are sent to a remote vendor or clearinghouse. The vendor or clearinghouse can manage the risk it bears by setting the predefined conditions appropriately.

In another embodiment, a synchronization protocol for peer-to-peer transactions is disclosed. A local computer system with a storage medium and a communications port is provided, as is a remote computer system with a storage medium and a communications port. The local system's storage medium contains a conditionally-accessible file, and the remote system is communicatively coupled to a database containing authorization records pertaining to the access of the conditionally-accessible file. The local computer system is configured to communicate with the remote computer system to obtain authorization to access the content of the conditionally-accessible file. The synchronization protocol is operable to enable the maintenance of a substantially real-time synchronized copy of the transactional state of the communication between the local computer system and the remote computer system. In one embodiment, the remote system is operable to obtain payment upon receipt of authorization from the database containing authorization records, and upon receipt of an acknowledgment from the local computer system that a user of the local computer system was able to successfully access the conditionally-accessible file.

In yet another embodiment, a method for conducting peer-to-peer transactions is disclosed. A request is received by a remote system to give authorization to a user of a local computer system to access data stored on the user's local system. The remote system verifies that the user is authorized to access the data and has sufficient funds in his or her account to pay for this access. The remote system sends authorization to the local computer system to allow the user to access the data. The local computer system is operable to receive the authorization, to give the user access to the data, and to send an acknowledgment to the remote system that the user was given access to the data. The remote system is operable to receive the acknowledgment, remove funds from the user's account, and send a signal to the local system indicating that the transaction is complete. If the local system does not receive this signal within a predefined amount of time after sending the acknowledgment, the local system is operable to send a second acknowledgment to the remote system. In one embodiment, a user of the remote system is able to set the predefined amount of time that the local computer system waits before sending the second acknowledgment. In yet another embodiment, the remote system is further operable to re-send the authorization to the local computer system if the remote system does not, within a predefined amount of time, receive an acknowledgment from the local system that the local system has given the user access to the content.

In another embodiment, a method is described for delivering transaction records to one or more clearinghouses using intermittent communication and polled acknowledgments, with delivery requirements specified by provider parties. Providers define their tolerance for an acceptable level of risk associated with unprocessed records by specifying thresholds. These thresholds are capable of acting in concert and of specifying age, record count, financial value, average age, age-weighted value, and other predefined characteristics. Records are delivered whenever communication is convenient, and acknowledgments are polled or repolled on the same basis. Records may go through multiple stages of processing—e.g., receipt, payment initiation, successful payment—at one or more destination systems, each of which stages returns an acknowledgment, and each of which stages may be governed by different thresholds.

In yet another embodiment, a method of granting access to a piece of content is disclosed. In accordance with this embodiment, a first computer system sends a request to a second computer, the request seeking permission to access the content. The first computer system also initiates the execution of a monitoring process. The monitoring process is able to detect acknowledgments from the second computer system. The second computer system receives the request from the first computer system and determines whether it should grant or deny the request. If the second computer system decides to grant the request, it sends a status signal to the first computer system. Upon receipt of the status signal, the first computer system releases the content for use, and sends a first acknowledgment to the second computer system. The monitoring process is operable to resend the first acknowledgment to the second computer system if the first computer system fails to receive a response to the first acknowledgment within a predefined amount of time.

In another embodiment, a method for managing the transmission of transactional audit records from a first computer system to a clearinghouse is disclosed. In accordance with this embodiment, a first count is maintained at the first computer system of the number of audit records accumulated at the first computer system. If the first count exceeds a predefined amount, then the audit records are scheduled for delivery to the clearinghouse. When the audit records are delivered to the clearinghouse, the clearinghouse may send an acknowledgment to the first computer system, the acknowledgment identifying the number of audit records that the clearinghouse has processed. Upon receipt of this acknowledgment, the first computer system decrements the first count by an amount equal to the number of audit records identified in the acknowledgment from the clearinghouse. In one embodiment, the first computer system also maintains a second count, the second count keeping track of the total value of the unpaid receipts from transactions conducted on the first computer system. When the audit records that correspond to these transactions are processed by the clearinghouse, the clearinghouse sends back an acknowledgment to the first computer system indicating that these receipts have been paid. The first computer system then decrements the second count accordingly.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of the invention is provided below. While the invention is described in conjunction with several embodiments, it should be understood that the invention is not limited to any one embodiment. On the contrary, the scope of the invention is limited only by the appended claims and encompasses numerous alternatives, modifications, and equivalents. For example, while embodiments are described in the context of systems and methods for communicating between physically remote computer systems via a network, those skilled in the art will recognize that the disclosed systems and methods are readily adaptable for broader application. For example, without limitation, the systems and methods of the present invention could also be readily applied in the context of inter-component communications in an integrated computer system. In addition, while numerous specific details are set forth in the following description in order to provide a thorough understanding of the present invention, the present invention may be practiced according to the claims without some or all of these details. Finally, for the purpose of clarity, certain technical material that is known in the art has not been described in detail in order to avoid obscuring the present invention.

The present invention provides systems and methods for conducting electronic transactions between remote parties in a manner that protects the rights and interests of the parties involved without unduly diminishing the efficiency of the transaction. A fault-tolerant communications protocol is described that facilitates immediate transactions between remote parties. The communications protocol consists of a sequence of signals sent between a consumer's system and a vendor's system. The protocol is designed to ensure the consumer that he or she will not be charged for an item until he or she receives the item, and to effectively ensure the vendor that the consumer will be charged for items which the consumer receives.

In another embodiment, systems and methods are provided for facilitating deferred transactions between remote parties. In accordance with this embodiment, a consumer is allowed to purchase and use electronic content without having to first connect to the vendor's remote system. A transaction processing application is resident on the consumer's system, and this application maintains a record of the transactions performed by the consumer. Upon the occurrence of predefined conditions, transactional records are sent to the vendor or a clearinghouse. The vendor or clearinghouse can manage the risk it bears by setting the predefined conditions appropriately.

Figure 1:
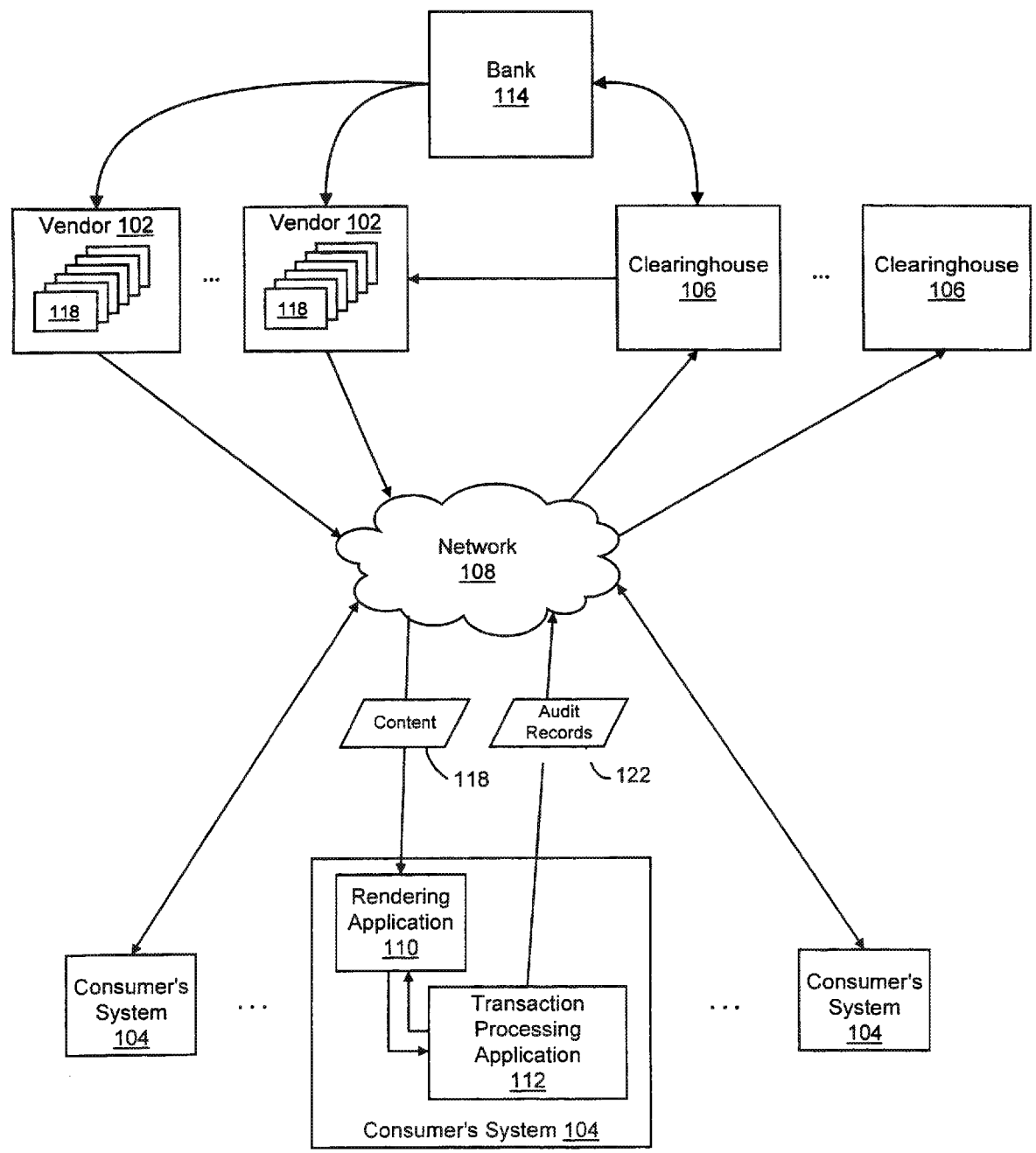
FIG. 1 illustrates a system for conducting transactions in accordance with the principles of the present invention.

FIG. 1 shows a system for conducting electronic transactions in accordance with embodiments of the present invention. As shown in FIG. 1, a vendor 102 supplies electronic content 118 to a consumer for use on the consumer's computer system 104. For example, a consumer might download an encrypted audio or video file from the vendor's Internet web site, or might obtain a diskette or CD containing such a file. Content 118 may be associated with certain rules that are intended to govern the consumer's use of the content. For example, the vendor of an audio track might wish to charge the consumer $0.10 each time the consumer listens to the track. To enforce such a rule, an application program 112 can be supplied to the consumer, the application program being capable of managing transactions on the vendor's behalf. When a consumer attempts to use downloaded content 118 by invoking a rendering program 110 such as an electronic jukebox, application 112 processes the consumer's request, charges the consumer's account, makes a record of the transaction, decrypts the content, and releases it to rendering application 110. Application 112 may also transmit records that relate to the transaction 122 to one or more clearinghouses 106 whose responsibility it is to ensure that the vendor is paid and the consumer is charged appropriately. Records 122 may, for example, contain information regarding the consumer's use of the content, such as the amount the consumer should be billed, or information that the consumer has agreed to provide regarding his or her usage habits. Clearinghouses 106 and/or vendors 102 may also communicate with a financial authorization center, such as bank 114, in order to obtain information regarding the consumer's credit balance and to charge the consumer's account. As described in more detail below, the present invention provides systems and methods for managing such transactions in an efficient, flexible, and secure manner.

In one embodiment, transaction processing software 112 comprises an instance of the InterRights Point™ software produced by InterTrust Technologies Corporation, of 4750 Patrick Henry Drive, Santa Clara, Calif. 95054. In this embodiment, content 118 and/or audit records 122 may be packaged in DigiBox® secure containers, also developed by InterTrust. However, it will be appreciated that for purposes of practicing the present invention, any content container or file format and/or transaction processing application can be used. Moreover, it should be understood that while in one preferred embodiment communications between consumers 104, vendors 102, and/or clearinghouses 106 are encrypted, digitally signed, packaged in secure containers, or otherwise protected, such protection is not required.

Thus, it should be appreciated that FIG. 1 is provided for purposes of facilitating a discussion of the present invention, and that a variety of modifications can be made to the basic architecture shown therein. For example, in some embodiments vendors 102 may collect transactional data 122 directly from consumers 104, and thus may obviate the need for separate clearinghouses 106. As another example, while FIG. 1 shows vendors 102 and clearinghouses 106 communicating with consumers 104 via a network 108 such as the Internet, it should be appreciated that any suitable form of communication could be used. For example, consumer's system 104 might comprise a handheld electronic appliance, such as a portable digital assistant, a handheld digital media player, or the like, and clearinghouse 106 might comprise a relatively-secure computer system at the consumer's site (e.g. a personal computer with a special chip or smart-card attachment)—possibly connected to a remote server via a dedicated connection (e.g., DSL or ordinary dial-up). In such an embodiment, consumer's system 104 might use the systems and methods of the present invention to communicate with the clearinghouse's local system 106 via an infrared or radio-wave signal, or by simply connecting a cable from the consumer's system to the clearinghouse's local system. The clearinghouse's local system might then communicate with the clearinghouse's remote system using the systems and methods of the present invention and/or by using well-known means for secure communication (e.g., SSL).

Figure 2:
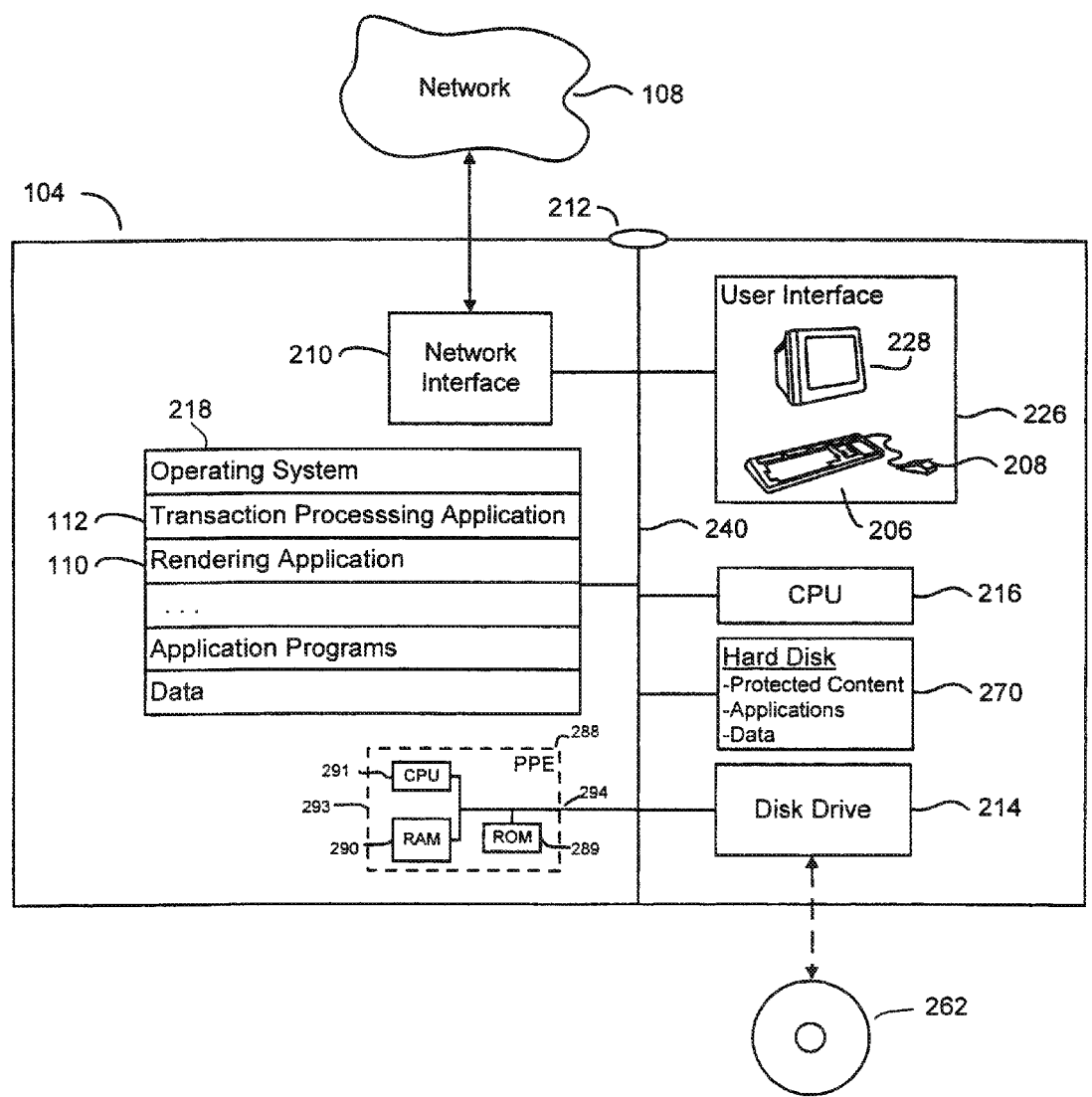
FIG. 2 shows a computer system for practicing embodiments of the present invention.

FIG. 2 provides a more detailed illustration of the structure and operation of consumer's system 104 in accordance with an embodiment of the present invention. As noted above, system 104 may consist of any suitable device, including without limitation a personal computer, a portable audio or video player, a television set-top box, a telephone, a personal digital assistant, or the like. As shown in FIG. 2, system 104 will typically include:

- a processing unit 216;
- system memory 218, preferably including both high speed random access memory (RAM) and read-only non-volatile memory (ROM) for storing programs and data for use and execution by processing unit 216;
- a bulk non-volatile storage unit 270, comprising erasable non-volatile memory, such as a magnetic, fixed disk (e.g., a hard disk) and/or flash memory, for storing protected content files, application programs, data, and the like;
- one or more input/output devices, such as:
  - network interface 210 for communicating with other systems via a network 108 such as the Internet;
  - I/O port 212 for connecting to one or more peripheral devices; and/or
  - one or more disk drives 214 for reading from, and/or writing to, diskettes, compact discs, DVDs, and/or other computer-readable media;
- a user interface 226, including a display 228 and one or more input devices, such as keyboard 206 and mouse 208; and
- one or more internal buses 240 for interconnecting the aforementioned elements of the system.

The operation of system 104 is controlled primarily by programs contained in system memory 218 and executed by the system's processing unit 216. For example, system 104 might contain one or more rendering applications 110 that are operable to display or otherwise present content to the user. In the case of protected content 118, in one embodiment rendering applications 110 submit requests to access the content to transaction processing application program 112. Transaction processing application 112 then grants or denies the request using the techniques described elsewhere herein.

Programming code for performing the electronic transaction methods described herein is preferably incorporated into transaction processing application 112 (e.g., directly or by linking a library module). While the methods of the present invention protect against certain forms of attack and/or circumvention—such as disconnecting the consumer's system 104 from network 108 during certain critical points of a transaction—these methods also derive some of their security from the integrity of transaction processing application 112 itself. Accordingly, preferred embodiments of the present invention make use of hardware and/or software security techniques to ensure that transaction processing application 112 operates as intended.

For example, in one embodiment system 104 may include a special-purpose protected processing environment 288, such as that provided by an integrated circuit housed in a tamper-resistant hardware package. As shown in FIG. 2, protected processing environment 288 may include non-volatile memory 289, volatile memory 290, a processor 291, a tamper-resistant barrier 293, and a communications port 294 for communicating with other components of system 104. Use of a protected processing environment is advantageous, in that it provides an area that is shielded from unauthorized observation or modification in which to run sensitive programs and to store cryptographic keys and other information. For example, transaction processing application 112, or selected portions thereof, can be loaded into RAM 290 of protected processing environment 288 and executed by CPU 291, thus protecting the operation of transaction processing application 112 from being tampered with or otherwise modified. Additional information about implementations of a protected processing environment can be found in commonly-assigned U.S. Pat. No. 5,892,900, "Systems and Methods for Secure Transaction Management and Electronic Rights Protection," issued Apr. 6, 1999 ("the '900 patent"), and commonly-assigned U.S. Provisional Application No. 60/150,126, "Secure Processing Unit Systems and Methods," filed Aug. 20, 1999, each of which is hereby incorporated by reference in its entirety.

In another, somewhat less-secure embodiment, transaction processing application 112 makes use of software obfuscation and other software self-defensive techniques to protect itself from undetected tampering. Additional information on suitable software obfuscation and self-defensive techniques can be found in the '900 patent, and in commonly-assigned U.S. patent application Ser. No. 09/095,346, entitled "Obfuscation Techniques for Enhancing Software Security," filed Jun. 9, 1998, and commonly-assigned U.S. patent application Ser. No. _____, entitled "Software Self-Defense Systems and Methods," filed Jul. 31, 2000, each of which is hereby incorporated by reference in its entirety.

In addition, system 104 might advantageously include hardware and/or software for +providing secure bulk storage for sensitive bookkeeping, usage, or other information. For example, a specialized hardware database can be used, and/or relatively-secure software storage protection mechanisms (or hybrid software-and-hardware mechanisms), such as those set forth in the '900 patent and in commonly-assigned U.S. patent application Ser. No. _____, entitled "Trusted Storage Systems and Methods," Maheshwari et al., filed Jul. 17, 2000 ("the Maheshwari application"), which is hereby incorporated by reference in its entirety.

While FIG. 2 sets forth the general architecture of a typical consumer system 104, it will be appreciated that a number of modifications could be made to the basic structure shown therein without departing from the principles of the present invention. Moreover, it will be appreciated that clearinghouses 106 and vendors 102 may make use of similar or identical systems.

Immediate Transaction Protocol

In an "immediate transaction," a consumer pays for electronic or other content at the time the content is released to the consumer. For purposes of illustration, an exemplary technique for conducting such a transaction is described in the context of a transaction between consumer 104 and clearinghouse 106, although it will be appreciated that such a transaction could just as easily be conducted between any suitable set of parties, including without limitation consumer 104 and vendor 102, vendor 102 and clearinghouse 106, and so forth.

When conducting an immediate transaction, it is important to maintain synchronization between the state of the consumer's system 104 and the state of the clearinghouse 106. For example, it would be undesirable for records on the consumer's system 104 to indicate that the consumer had purchased a piece of content, while records at the clearinghouse 106 indicated that the consumer had not. Nor would it be desirable for records at the clearinghouse 106 to indicate that the content had not been released to the consumer, when, in fact, it had been released.

However, maintaining synchronization between peers in an electronic peer-to-peer communication—such as the communication between consumer 104 and clearinghouse 106—is a difficult task. For example, if the consumer's system sends a signal to the clearinghouse, there is generally no way for the consumer's system to know whether the clearinghouse received the signal, save for receiving an acknowledgment from the clearinghouse indicating that the signal was received. However, the clearinghouse will similarly not know if the consumer's system received that acknowledgment, unless the consumer's system, upon receipt of the acknowledgment, sends its own acknowledgment back to the clearinghouse. This second acknowledgment will necessitate a third acknowledgment, and so forth, thus presenting the system designer with a potentially infinite recursion.

One way to break the recursion is to have both the consumer and the clearinghouse send their acknowledgments to a third party, who then sends a signal back to each of the parties indicating that the acknowledgment from the other party was received. However, the overhead of adding a third party to the transaction can be relatively large, and may not always be possible or desirable for security reasons. And, of course, communications between the third party and each of the other parties will still suffer from the original problem of infinite regress. Accordingly, the addition of a third party mediator is typically not, by itself, an adequate solution.

The state-synchronization problem is particularly acute in the context of distributed computing environments—such as that shown in FIG. 1—which are used to conduct financial or other sensitive transactions. In this context, there is typically an incentive for one or both of the parties to cheat the other by tampering with the system. For example, a consumer—perhaps located in a foreign country—might receive content from the vendor and then refuse to pay, leaving the vendor with no effective recourse. Similarly, a vendor may accept payment and then refuse to deliver the content that was purchased. In addition, there might be an incentive for third parties to interfere with transactions, to the detriment of some or all of the legitimate parties. Finally, occasional system failures can be expected to occur, which, without malicious intent, may prevent transactions from executing in a timely or efficient manner.

The present invention provides systems and methods for conducting electronic transactions in an effectively simultaneous fashion from the viewpoint of the participants, and enables the execution of immediate transactions without the necessity of having a third party intermediary. In a preferred embodiment, the parties are provided with enough information about the transaction's progress to allow them to recover, should anything unexpected happen, in an efficient and predictable manner.

An illustrative communications protocol in accordance with an embodiment of the present invention will now be described with reference to FIGS. 3A-3G, which show the actions performed by, and the sequence of communications between, a local computer system and a remote computer system. The local computer system might, for example, represent a consumer's computer system, and the remote computer system might represent a content distributor's computer system, or the system of a party—such as clearinghouse 106—charged with collecting payment on behalf of the content distributor. However, it should be appreciated that the local computer system and the remote computer system can be those of any suitable entity. Moreover, while for ease of explanation, actions may be described as being initiated or performed by the local system or the remote system, it will be appreciated that these actions are typically carried out by appropriate software, such as transaction processing application 112, or hardware contained within those systems.

Figure 3A:
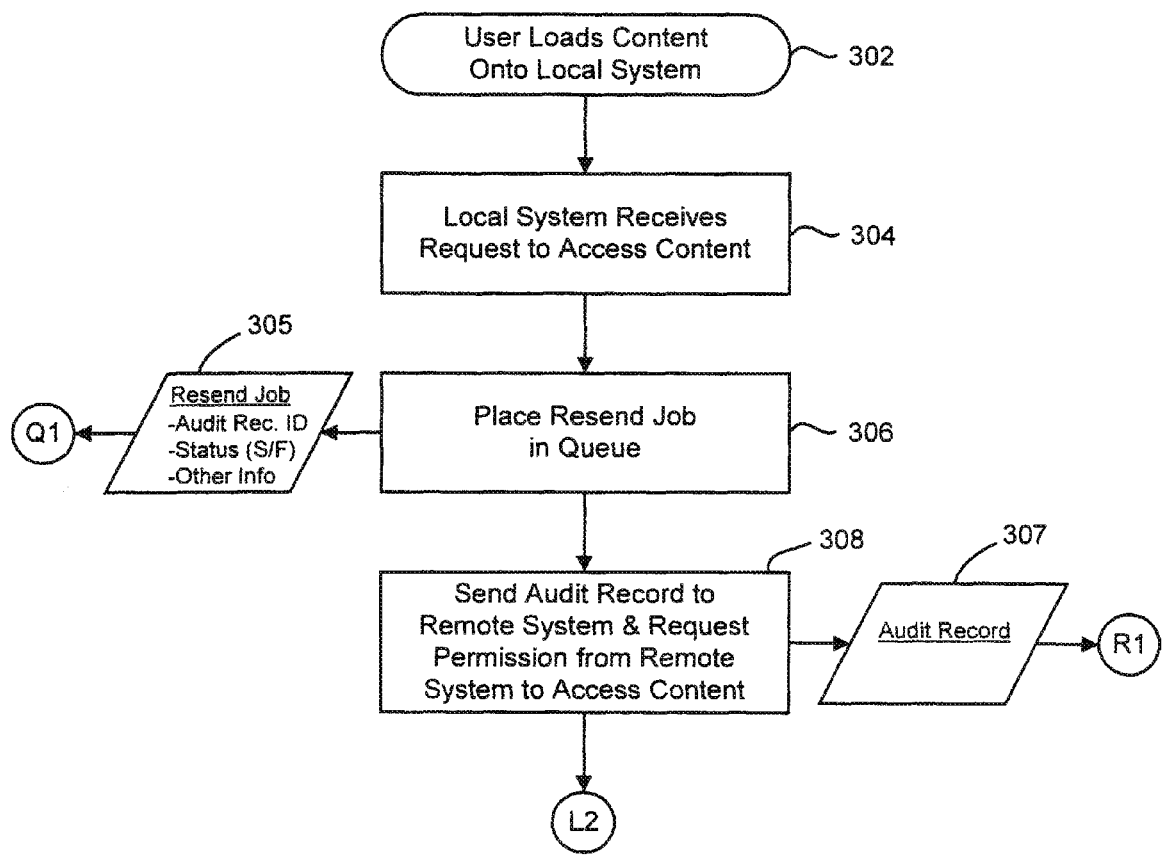
FIGS. 3A, 3B, 3C, 3D, 3E, 3F, and 3G illustrate various aspects of a communications protocol in accordance with an embodiment of the present invention.

As shown in FIG. 3A, a consumer may download or otherwise obtain content that is encrypted or stored in some other manner that renders it practically inaccessible (302). Upon receiving the consumer's request to access the content (304), the consumer's local system 104 generates one or more audit records and places a job 305 (explained in more detail below) into a job queue maintained by application 112 (306). For example, application 112 may include a thread that functions as a manager of background tasks placed in the queue. Job 305 preferably includes an identification of the audit record to which it corresponds and an indication of whether the transaction associated with the audit record has succeeded or failed (e.g., a two state status flag indicating success or failure). When the job is first placed in the job queue, its flag is initialized to failure. Local system 104 then initiates communication with a remote system, such as clearinghouse 106 or vendor 102, to obtain authorization to access the content. In addition, a copy of the audit record 307 is sent to the remote system (308).

Figure 3B:
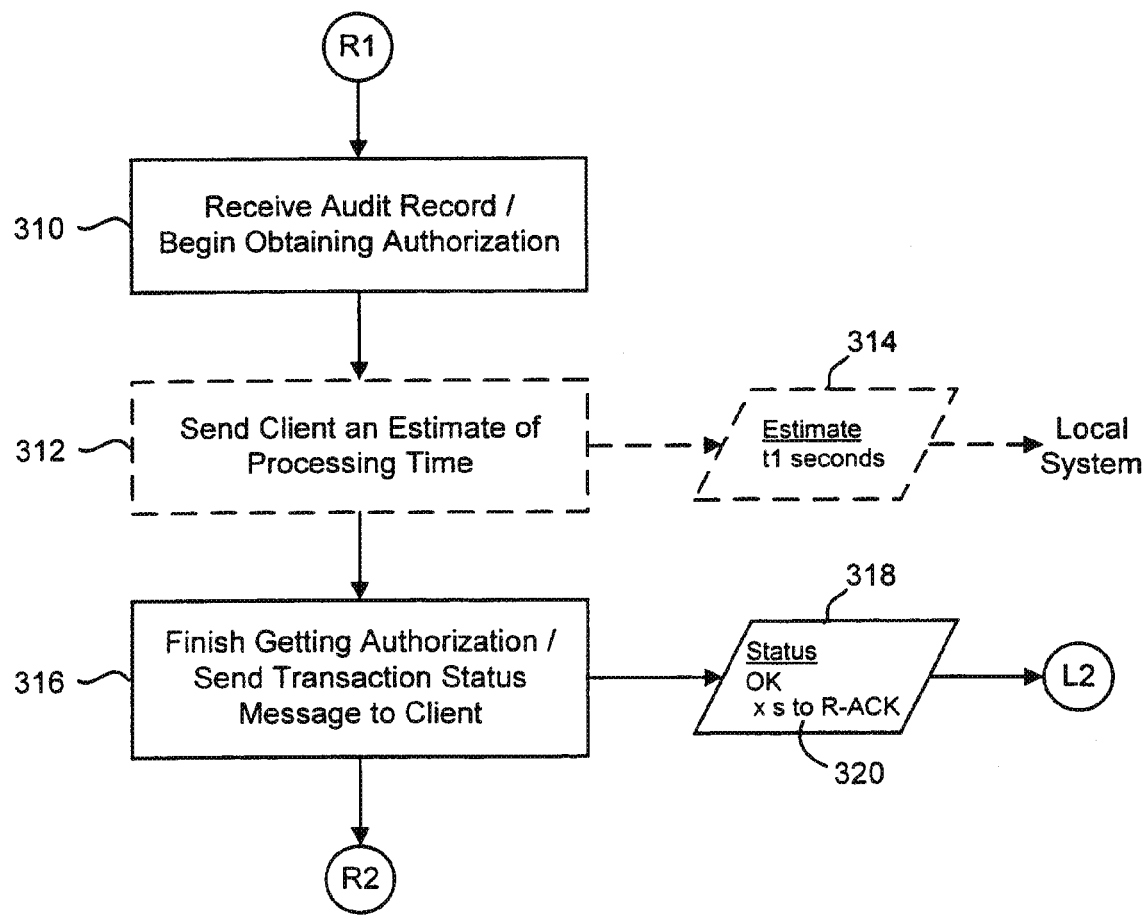

As shown in FIG. 3B, the remote system receives audit record 307 and begins processing the transaction to which the audit record corresponds (310). For example, the remote system may contact a bank 114 or other financial authority to determine whether the consumer's credit card is valid and has enough available credit to cover the transaction described by audit record 307. As shown in FIG. 3B, in some embodiments, the remote system may send an optional signal 314 to the local system in order to provide an estimate of the time needed to complete the authorization process (312). Upon receipt of such a signal, the local system may, for example, display a message to the consumer indicating how long the authorization process is expected to take. In addition, the local system may send the remote system a return acknowledgment.

Referring once again to FIG. 3B, when the remote system finishes the process of determining whether to authorize the transaction, it sends a transaction status message 318 to the local system indicating either that authorization was obtained (e.g., an ok signal) or that authorization was not obtained (e.g., a denied signal) (316). If authorization was obtained, the remote system may also send an indication 320 of how long the local system should wait for the remote system to send another signal—the "resend-acknowledgment" signal—the purpose of which is described below. In addition, if authorization was obtained, the remote system may put a lock on the consumer's account in order to prevent the consumer's credit balance from falling below the level needed to complete the transaction, thus ensuring that there will be sufficient funds available once the remote system is allowed to capture funds from the consumer's account.

If authorization for the transaction was denied, the remote system sends a status message to that effect to the local system. Upon receipt of such a message, the local system aborts the transaction, and may display a message to the consumer indicating what happened. If the consumer's system receives a signal indicating that authorization was denied, the requested content is not released to the consumer.

Figure 3C:
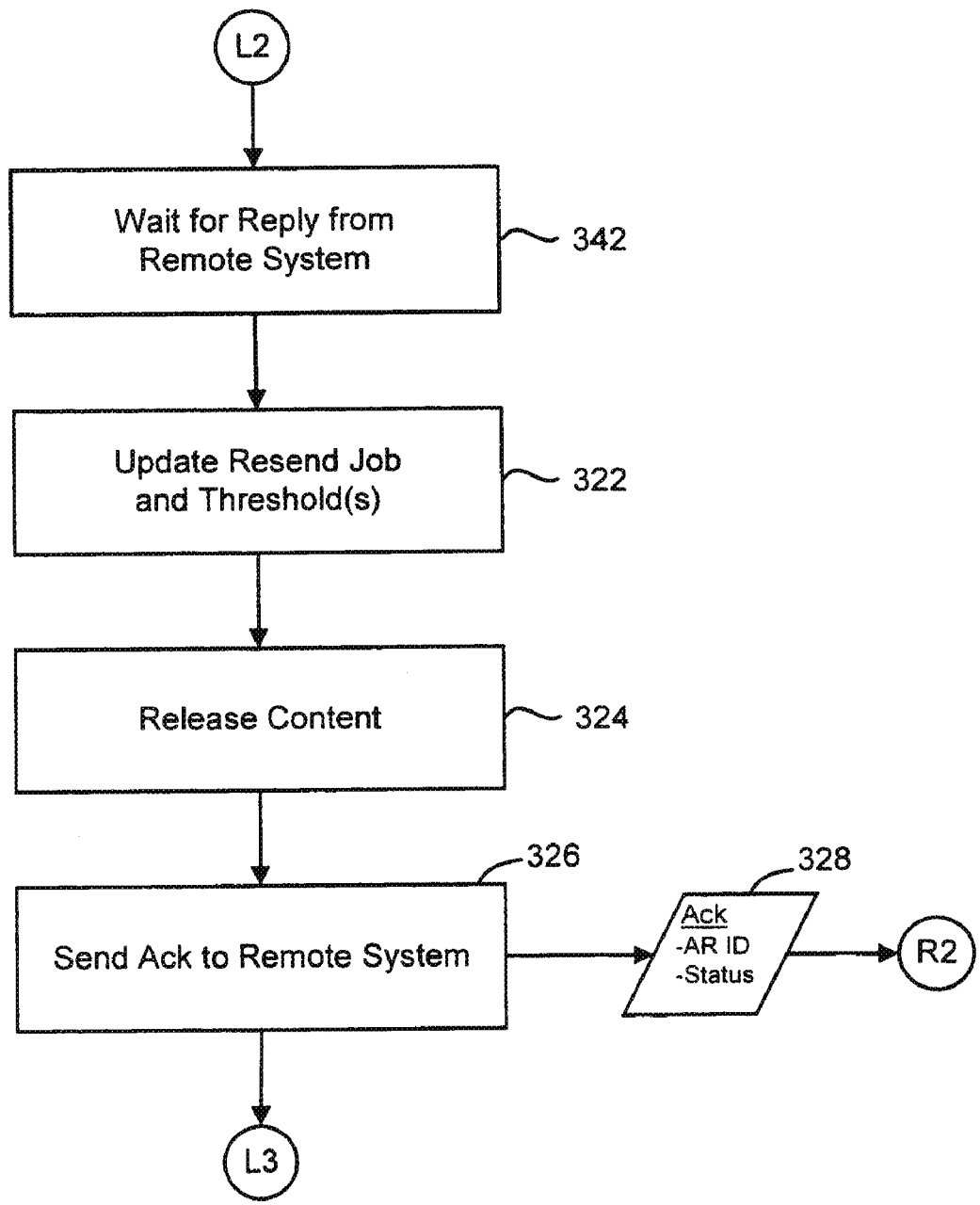

If, on the other hand, authorization was obtained, then, as shown in FIG. 3C, upon receipt of transaction status signal 318 (342), the local system updates the status flag of job 305 to indicate success, and updates any relevant thresholds, as described in more detail below (322). The local system then completes its end of the transaction by, e.g., decrypting the content and releasing it to the consumer (324). After releasing the content, the local system sends an acknowledgment 328 to the remote system indicating that the transaction was successfully completed (326). In one embodiment, the steps performed by the local system following the receipt of authorization 318 (342) are performed "asynchronously." That is, the process of decrypting and releasing the content proceeds independently of the remaining steps in the protocol, thus providing the consumer with faster access to the content, since the consumer will not need to first wait for the sequence of communications between the local system and the remote system to conclude.

Figure 3D:
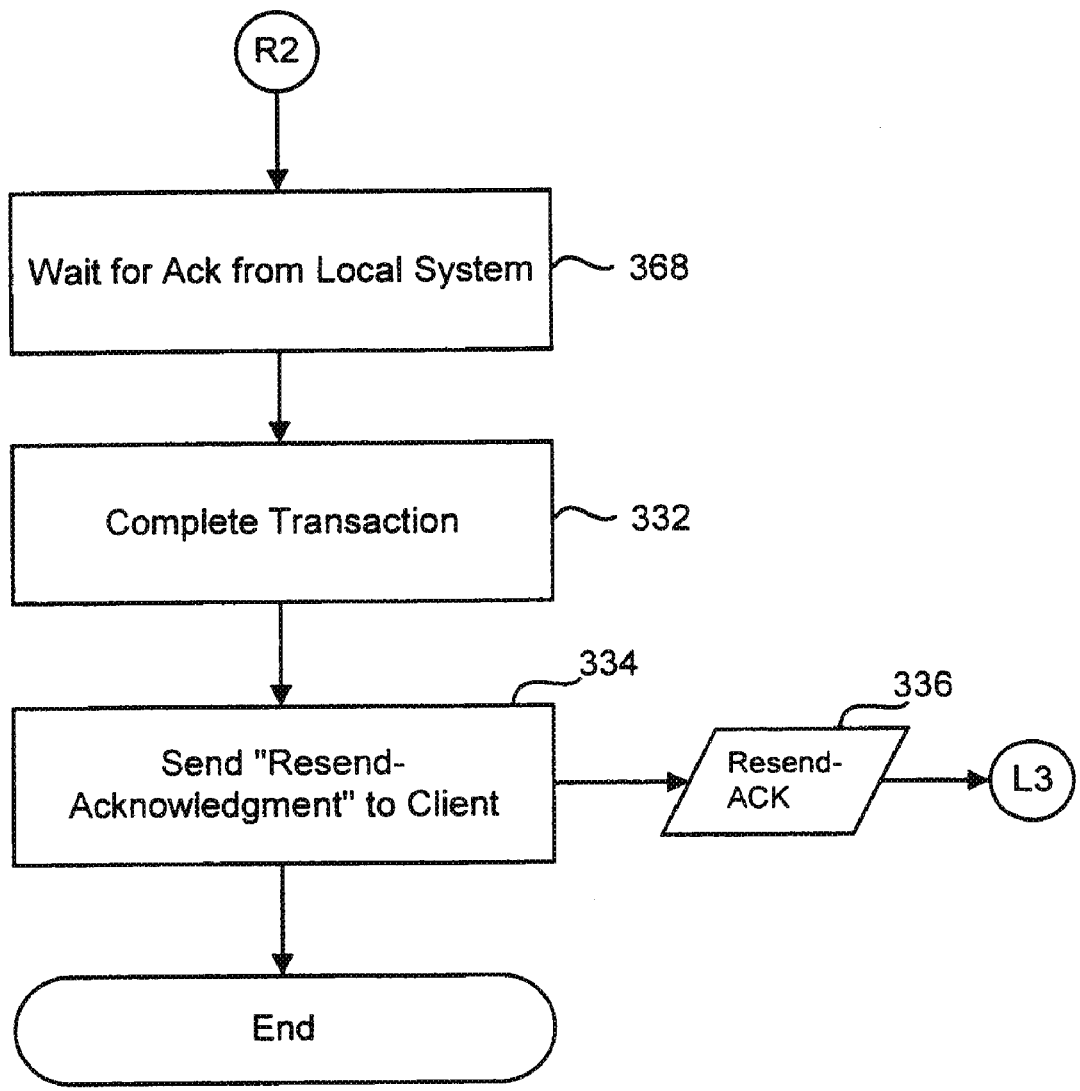

As shown in FIG. 3D, upon receiving acknowledgment 328 (368), the remote system completes its part of the transaction by, e.g., posting the transaction to the consumer's credit card, withdrawing funds from the consumer's account, and/or taking other appropriate action (332). The remote system also sends an acknowledgment 336—i.e., the resend-acknowledgment signal—to the local system, indicating that the remote system received the local system's acknowledgment 328 and completed its end of the transaction (334).

Figure 3E:
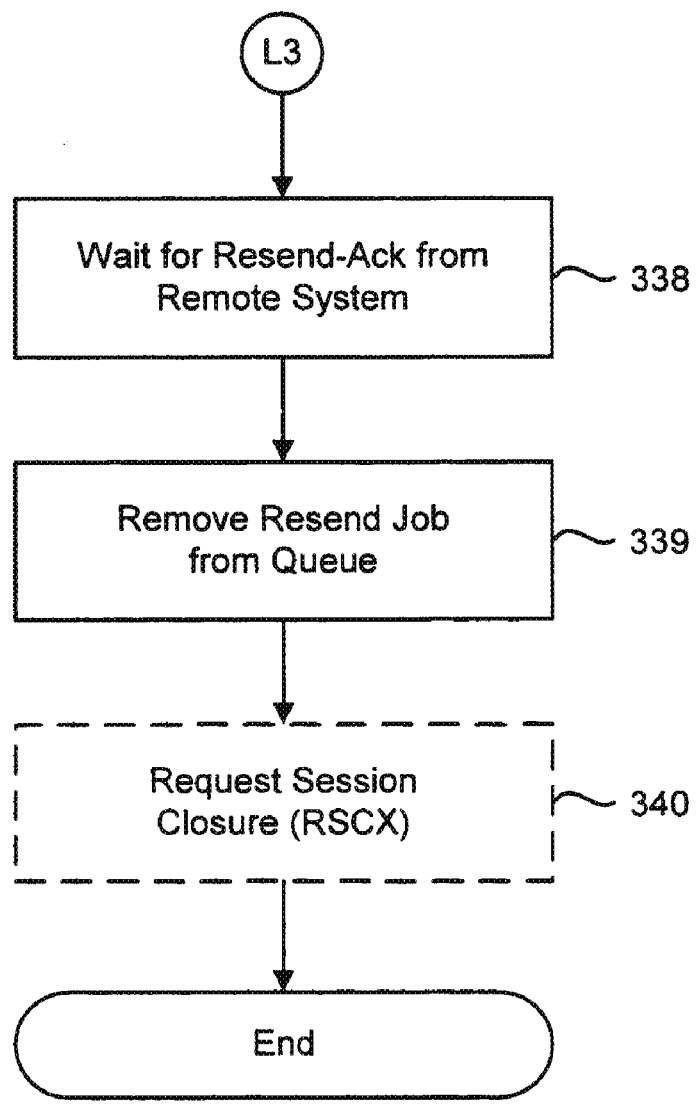
Figure 3F:
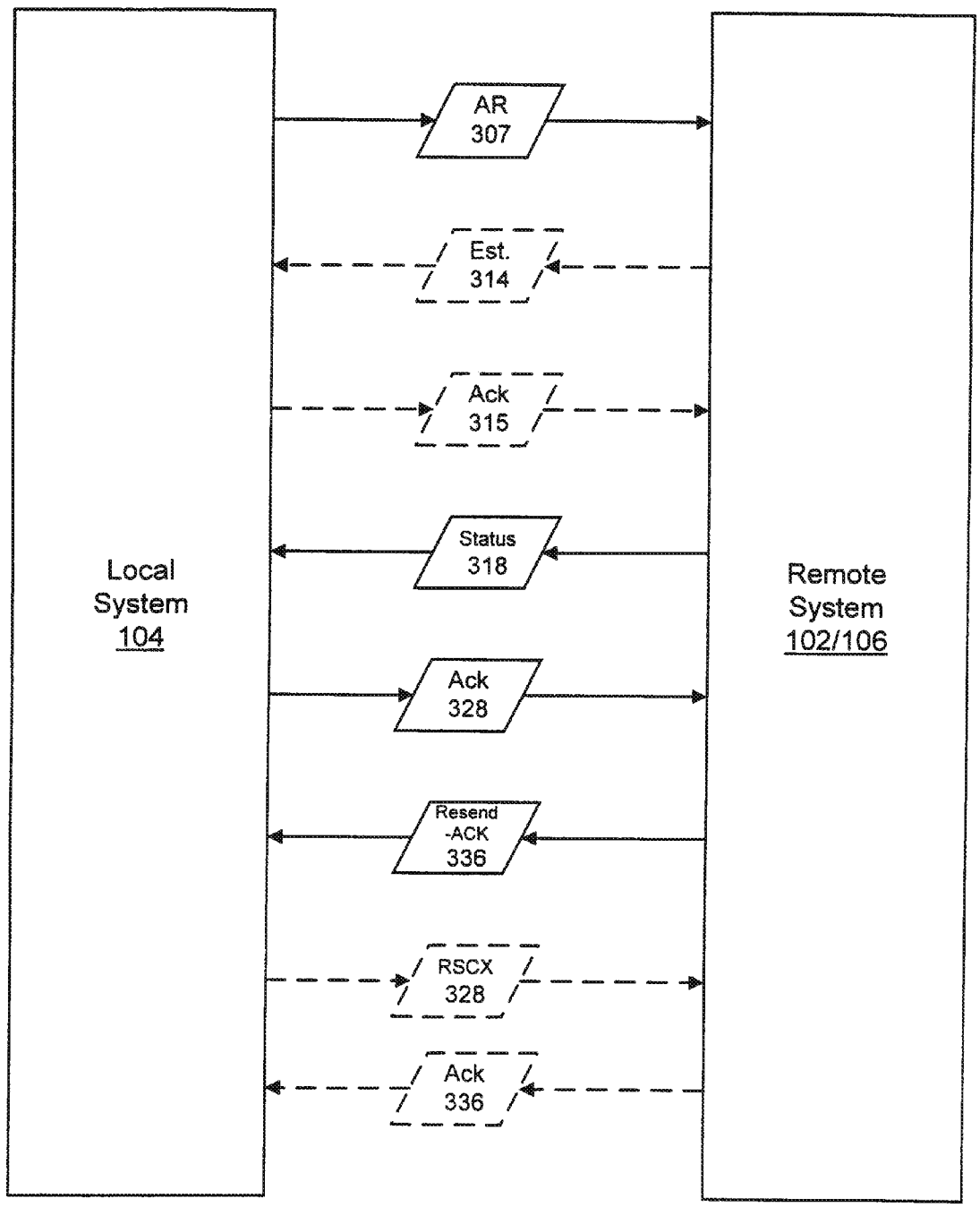

As shown in FIG. 3E, upon receipt of resend-acknowledgment signal 336 (338), the local system removes job 305 from its background job queue (339). In some embodiments, the local system may also send a request for session closure (e.g., RSCX) to the remote system (and receive an acknowledgment thereto) before closing the line of communication (340). FIG. 3F summarizes the sequence of communications between the local and remote systems in the embodiment described above.

Due to inefficiencies, failures, or attempts to attack the system—occurring at the local system, at the remote system, and/or on the network—the communication between the local CI system and the remote system may not proceed in the manner described above. For example, one or more of the signals between the local system and the remote system may be lost, delayed, diverted, or corrupted. The present invention provides mechanisms for efficiently responding to such failures in a manner that is consistent with system rules and security constraints. Examples of several fault conditions, and the system's response thereto, are provided below.

Local System Fails to Receive Status Signal 318. After the local system sends an audit record to the remote system (i.e., block 308 in FIG. 3A), the local system waits for transaction status signal 318 from the remote system (i.e., block 342 in FIG. 3C). If the local system does not receive the status signal (or does not receive it in a predefined amount of time), then in one embodiment the local system resends the audit record (or a message indicating that no status signal has been received), repeating this process a predetermined number of times before giving up and, e.g., informing the consumer that the remote system is not responding or that the network connection has failed. This process can be integrated with the resend job 305 performed by application 112's background manager, or can be performed independently. In other embodiments, the local system gives up without retrying after a predefined amount of time has elapsed. If the local system does not receive transaction status signal 318, the local system does not release the content to the consumer or otherwise perform the action for which authorization was sought. Moreover, since the local system will thus fail to send acknowledgment 328 to the remote system, the remote system will not debit the consumer's account.

Remote System Fails to Receive Acknowledgment 328. Similarly, after the remote system sends a transaction status signal 318 to the local system, indicating that the transaction has been authorized, the remote system waits for an acknowledgment 328 from the local system indicating that the transaction was successfully completed (i.e., block 368 of FIG. 3D). As described above, upon receipt of acknowledgment 328, the remote system proceeds with completing its end of the transaction by, e.g., capturing the authorized, and possibly locked, funds (i.e., block 332 of FIG. 3D). However, if the remote system does not receive acknowledgment 328, the remote system will not authorize capture of the funds. Moreover, the remote system will not send signal 336 to the local system, which, as described below, will cause the local system to resend signal 328 (if it was sent in the first place).

In addition, if the remote system does not receive the indication 328 from the local system that the transaction has completed (or failed), the operator of the remote system might take appropriate defensive action—e.g., contact the consumer or owner of the local system, put a hold on the consumer's account, check the network and/or the remote system for failures, etc.—thus preventing an attacker from defrauding the system, and thus enabling a rapid diagnosis of equipment problems.

Local System Fails to Receive Acknowledgment 336. If the local system fails to receive resend-acknowledgment signal 336 within a predefined period (e.g., 1, 2, or 5 minutes) after releasing content to the consumer and sending acknowledgment 328 to the remote system (and/or a predefined amount of time after the initiation of resend job 305), then the local system automatically resends the acknowledgment 328 and/or a copy of the audit record 307 indicating that the transaction was successfully completed. As described above, upon receipt of this signal, the remote system captures the funds reserved in block 316 of FIG. 3B, and/or takes other appropriate action.

Figure 3G:
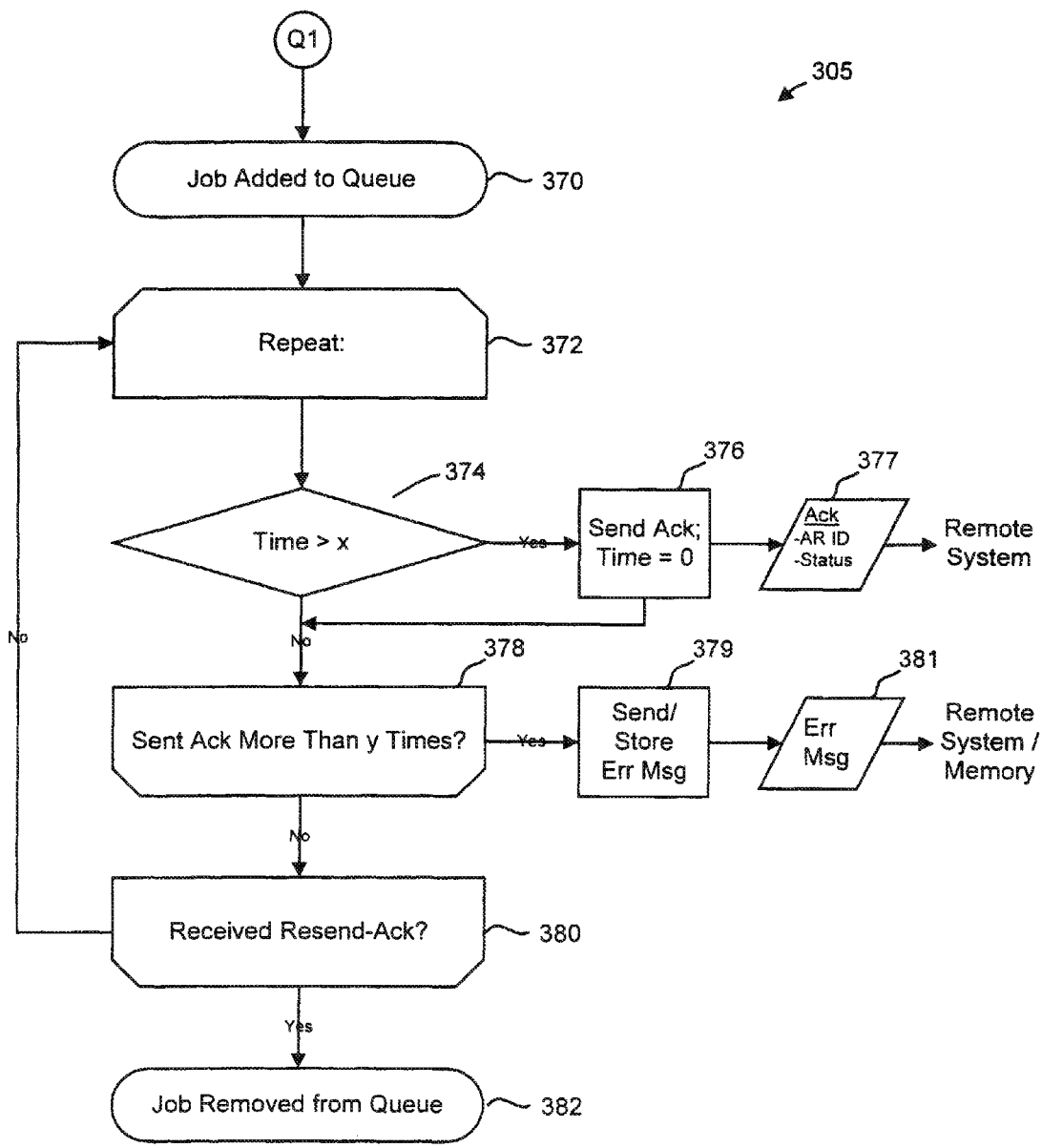

The operation of the resend job 305 that is responsible for this functionality is shown in FIG. 3G. As indicated above, in one embodiment resend job 305 comprises a background thread or other concurrent process in application 112 that is initiated when the consumer requests access to protected content (370). As shown in FIG. 3G, resend job 305 is operable to automatically attempt to send (or resend) an acknowledgment 377 (such as acknowledgement 328) and/or audit record to the remote system on a periodic basis until the resend-acknowledgment signal is received (372-380). The background job may also be operable to send an error message or warning (379) to the remote system if a predefined period elapses without receipt of the resend acknowledgment signal, and/or if a predefined number of unacknowledged attempts are made to send acknowledgment 377 (378). Resend job 305 thus provides a mechanism for completing a transaction despite the occurrence of temporary failures that cause the loss or delay of acknowledgment 328. Moreover, resend job 305 can advantageously counter an attacker's attempt to avoid payment by disconnecting or disrupting the local system's communication with the remote system, and/or by intercepting the local system's acknowledgment 328. The resend job makes such an attack more difficult by increasing the number of signals that the attacker must intercept or corrupt in order to evade detection, and by effectively forcing the attacker to remain disconnected from the network, since whenever the attacker connects to the network, the background resend job will resend the acknowledgment (or error message) to the remote system, thus enabling the remote system to capture the funds and/or detect the suspicious activity.

In one embodiment the consumer's transaction processing application 112 may also store a secure record of its failure to receive the resend-acknowledgment signal 336 for later use in determining the source of the system failure. The remote system may later retrieve this record from the local system, and/or the consumer may produce it to the operator of the remote system in order to account for what happened, and/or to demonstrate the proper operation of the consumer's local system.

In a preferred embodiment, the operator of the remote system is able to specify the amount of time, x, that the local system's background resend job should wait before resending the acknowledgment 328 (and/or the number, y, of unacknowledged transmissions of acknowledgment 328/377 to tolerate before sending/storing an error or message 381). For example, a specification of this time period 320 can be sent to the local system along with the authorization to release the content 318, or can be provided at another suitable time. Thus, content owners and distributors are provided with a mechanism for controlling the conduct of the transaction and their exposure to system failures.

Local System Releases Content Despite Receiving a Negative Status Signal 318. In a preferred embodiment, the local system automatically sends the remote system a status report when content is released, and/or when an audit record's status is changed from failure to success (unless the remote system requests that this report not be sent). This communication is preferably integrated with the background communication process 305 that is queued whenever content is requested (or, in some embodiments, released). As described above, the background process 305 remains in operation until a communication is received from the remote system indicating that the remote system was able to complete its side of the transaction. Thus, if the local system fails to obey the remote system's instructions not to release content, the operator of the remote system will be informed and can take immediate defensive action. In order to avoid detection by the remote system, an attacker may thus need to keep the local system disconnected from any communications medium (such as the Internet) by which the background processing job can transmit the message to the remote system. This will typically not be a very attractive option for the attacker, especially if the value of the purchased content is relatively small in relation to the inconvenience of being unable to fully use the local system.

One of ordinary skill in the art will appreciate that for purposes of clarity, a description of certain well-known signals dictated by the underlying network protocol or transport layer (e.g., TCP/IP, HTTP, FTP, AAL 5, etc.) has been omitted from the foregoing discussion. In addition, while the discussion has focused primarily on two-party transactions, it will be appreciated that the present invention is readily adaptable to transactions involving more than two parties. Moreover, while it has been implicitly assumed that the conditionally-accessible content resides on the consumer's local system during the process described above, it will be appreciated that this content could be stored at a remote location, including on remote system 102 or 106, during all or part of the process without departing from the principles of the present invention.

Moreover, while a communications protocol has been presented in the context of immediate transactions between a consumer 104, vendor 102, and/or clearinghouse 106 involving the purchase of electronic content, it will be appreciated that the protocol can be readily applied to other situations. For example, the protocol could be used to manage the transfer of funds from clearinghouse 106 to vendor 102, to manage the transfer of audit records between consumer 104 and clearinghouse 106 in a non-immediate transaction, and/or to facilitate a variety of other types of transactions or communications.

Deferred Transactions

Thresholds

The foregoing discussion has focused primarily on transactions in which the consumer is expected to pay for content at the time it is released for use (or at effectively the same time). As described above, such transactions generally require a connection between the consumer's system and the vendor's system (or clearinghouse). However, to enhance performance and fault tolerance, and to facilitate a wider range of business relationships between vendor and consumer, it may also be desirable to allow the consumer to purchase and use content without connecting to the vendor's system, deferring payment until a later time when connecting to the vendor's system is more convenient. While deferred transactions provide the consumer with more flexibility, and thus provide the content vendor with increased sales opportunities, deferred transactions also present the vendor with increased risk, as an attacker might take advantage of the relative isolation of the consumer's computer system to attempt to modify or steal protected content, to delete or alter transactional records, or to tamper with the operation of the transaction processing application. The present invention provides systems and methods that enable content owners and vendors to manage their exposure to such attacks.

Figure 5:
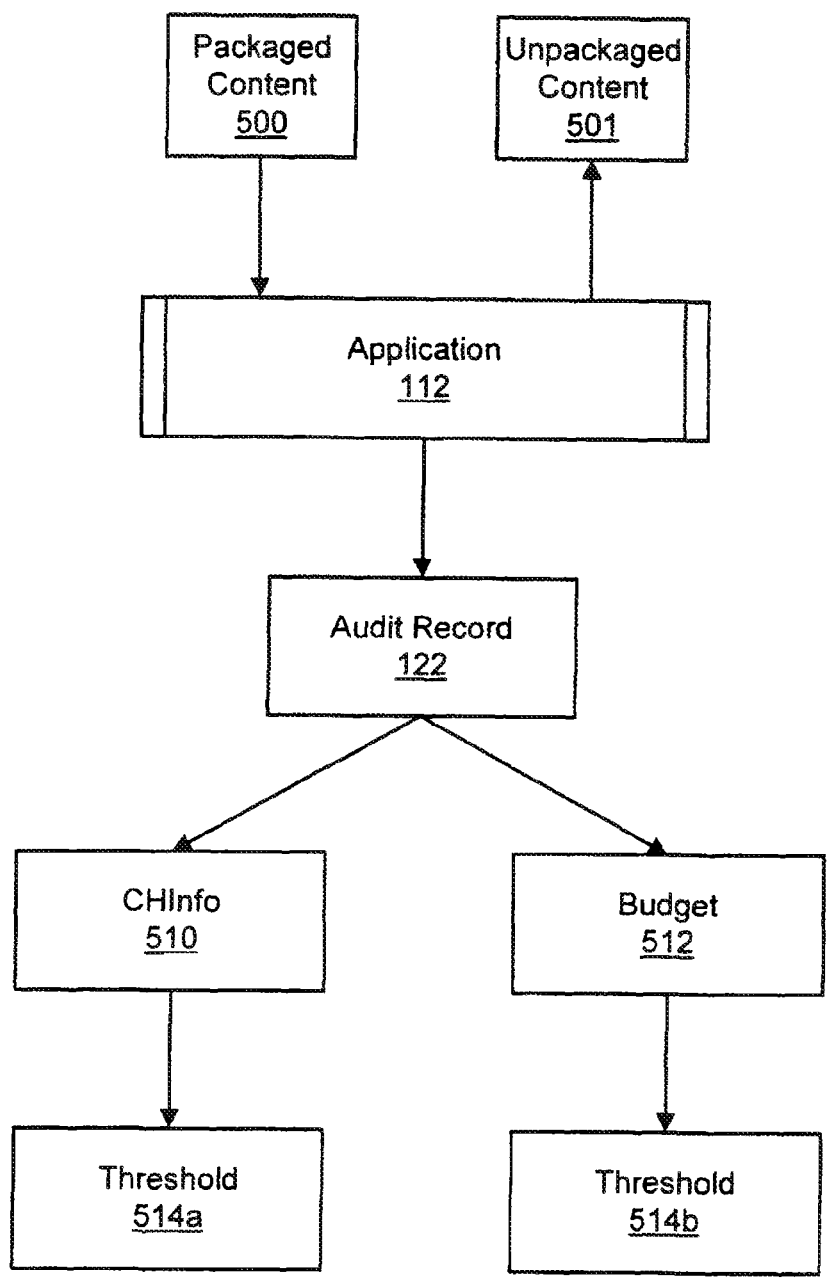
FIG. 5 illustrates the use of thresholds in accordance with an embodiment of the present invention.

In a preferred embodiment, secure deferred transactions are enabled by providing the consumer with a transaction processing application 112 that resides on the consumer's system 104 and conducts and manages transactions on the vendor's behalf. When the consumer purchases a piece of content, application 112 decrypts the content and releases it to the consumer. As shown in FIGS. 1 and 5, application 112 also creates one or more audit records 122 detailing, among other things, the price the consumer paid for the content, the identity of the clearinghouse 106 to which the audit records should be sent for processing, and the like. To prevent undetected deletion or modification, application 112 preferably stores audit records in secure, tamper-resistant storage, such as that described in the '900 patent or the Maheshwari application, both of which were previously incorporated by reference. In addition, application 112 preferably incorporates software self-defense techniques and/or is run in a secure environment such as protected processing environment 288 in FIG. 2.

As shown in FIG. 5, in one embodiment audit records 122 may reference one or more clearinghouse information (CHInfo) objects 510 and/or budgets 512, which, in turn, may reference one or more thresholds 514. A CHInfo object 510 is a programming construct that may be associated and/or packaged with protected content 118. A CHInfo object 510 identifies the clearinghouse associated with the content, the forms of payment accepted by the clearinghouse, and a list of thresholds that control the delivery of payment or audit records to the clearinghouse. Similarly, a budget object 512 is a programming construct that is typically provided to (and/or instantiated within) the consumer's transaction processing application 112 by an issuer of credit or a provider of debit accounts or electronic cash. The consumer's budget contains information about the consumer's account (e.g., balance, available credit, etc.) and a list of thresholds governing the payment of accumulated balances and the like.

In general terms, thresholds 514 provide a mechanism for monitoring transactions on the consumer's system and for triggering predefined actions when certain conditions occur. For example, thresholds 514 may place limits on the quantity of offline charges or audit records that the consumer can accumulate before connecting to a clearinghouse, budget provider, or vendor's computer system. Thus, a threshold 514b on budget 512 can be viewed as limiting the exposure of the budget provider, while a threshold 514a on CHInfo object 510 can be viewed as protecting the rights of the clearinghouse.

Figure 4:
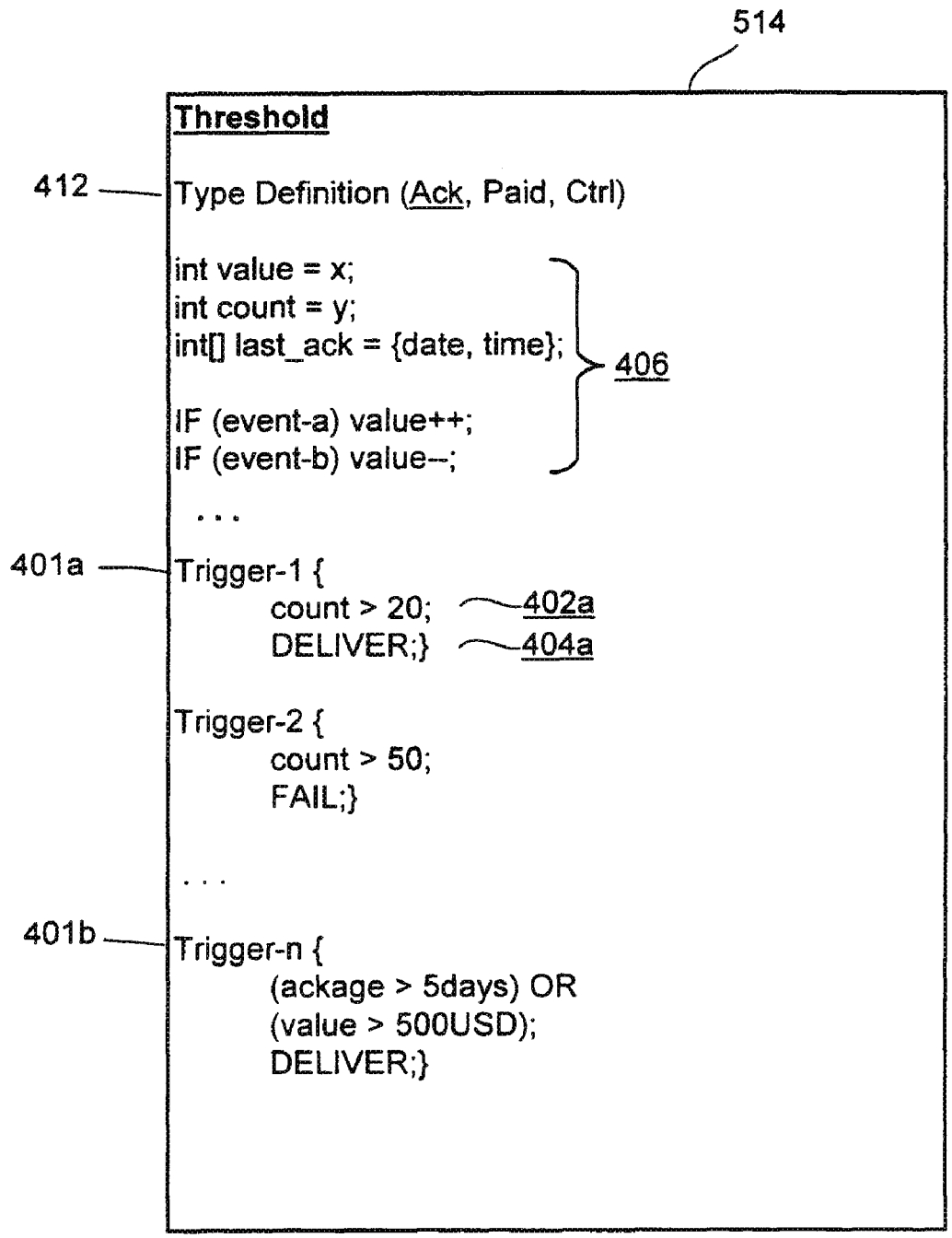
FIG. 4 illustrates the structure and function of a threshold object in accordance with an embodiment of the present invention.

FIG. 4 provides a more detailed illustration of the structure of a threshold object 514 in accordance with an embodiment of the present invention. As shown in FIG. 4, a threshold 514 typically includes a type definition 412 (e.g., acknowledgment, paid, or controlled), one or more triggers 401, and a variety of state information 406—such as a current value (e.g., a currency amount), a current count (e.g., a count of accumulated audit records), and a last acknowledgment (e.g., an indication of the last time the consumer's system communicated with a clearinghouse).

One of ordinary skill in the art will appreciate that the structure and functionality depicted in FIG. 4 can be readily-implemented in one or more data structures maintained by transaction processing application 112. For example, in one embodiment thresholds are implemented as objects in an object-oriented programming language such as C++ or Java. However, one of ordinary skill in the art will appreciate that the functional relationships depicted in FIG. 4 can be readily implemented in any suitable fashion without departing from the principles of the present invention.

The variables that comprise a threshold's state may be incremented when a transaction occurs (e.g., when a consumer purchases or uses a piece of content), and may be reset or updated in response to events such as the successful delivery of audit records to a clearinghouse. For example, if a customer buys a piece of content for $5.00 and generates two audit records in the process, the VALUE variable of the appropriate threshold would be increased by $5.00 and the threshold's COUNT would be increased by two. When the audit records are delivered to the clearinghouse, the threshold's COUNT would be reduced by two, and the threshold's LAST_ACKNOWLEDGMENT variable could be updated to reflect the date and time that the records were delivered. Similarly, when the $5.00 is paid (e.g., when the audit records are acknowledged as having been processed by the clearinghouse), the threshold's VALUE would be reduced by $5.00.

Table 1 provides an illustrative list of the types of thresholds used in one embodiment of the present invention, and the conditions under which the thresholds' state variables are updated.

TABLE 1

| Type of Threshold | State Updated |
| --- | --- |
| Acknowledgment Threshold | Updates its state when a group of audit records is successfully sent to the clearinghouse |
| Paid Threshold | Updates its state when a processed acknowledgment is received from the clearinghouse |
| Controlled Threshold | Updates its state in response to execution of a control program |

As shown in Table 1, and as described in more detail below in connection with FIG. 7, in one embodiment acknowledgment thresholds and paid thresholds are updated in response to acknowledgments received from a clearinghouse. In contrast, in a preferred embodiment controlled thresholds are updated by special control programs. For example, a controlled threshold might be attached to a prepaid budget object, and the budget provider might use a special control program to manage the budget—e.g., to add additional funds to the prepaid budget in response to a consumer's request. This mechanism thus gives the budget provider explicit control over when and how the controlled threshold, and hence the budget, is updated. Additional information on the generation and use of control programs such as the one referred to in this example can be found in commonly-assigned U.S. patent application Ser. No. _____, entitled "Systems and Methods for Controlling, Managing, Identifying, and/or Creating Objects in a Distributed Computing Environment," filed Jul. 31, 2000, which is hereby incorporated by reference in its entirety.

Referring once again to FIG. 4, in one embodiment triggers 401 each include a conditional expression 402 and an action 404. When the conditional expression is satisfied, the trigger fires and the action is carried out. Table 2 illustrates three types of conditions that can be evaluated in a conditional expression 402.

TABLE 2

| | Types of Conditions |
| --- | --- |
| VALUE | Evaluates the total monetary value of the audit records that reference this threshold. |
| COUNT | Evaluates the total count of audit records that reference this threshold. |
| ACKAGE | Evaluates how much time has elapsed since the last acknowledgment received from the clearinghouse. |

Figure 6A:
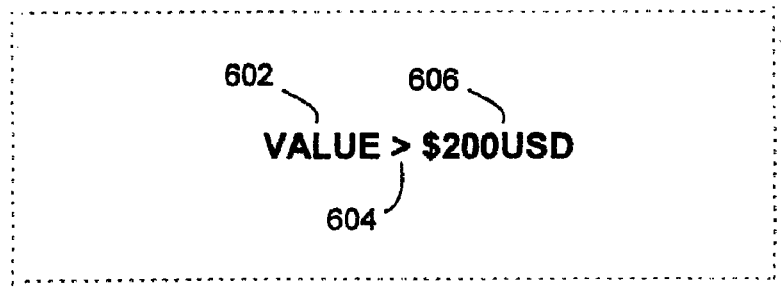
FIGS. 6A, 6B, and 6C illustrate the form of several types of conditional expressions that can be used with thresholds in accordance with embodiments of the present invention.
Figure 6B:
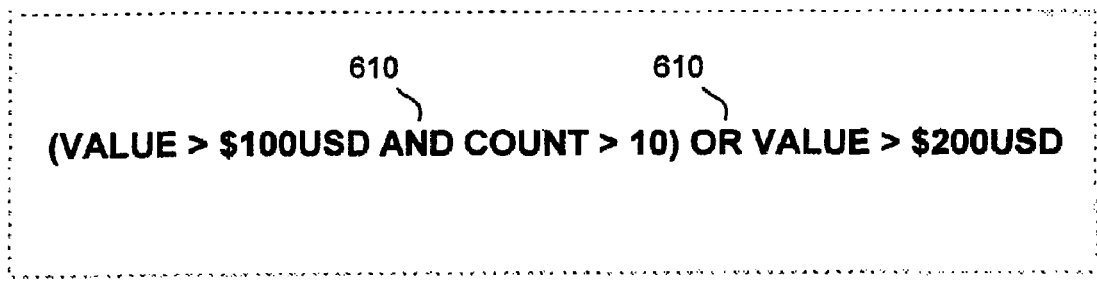
Figure 6C:
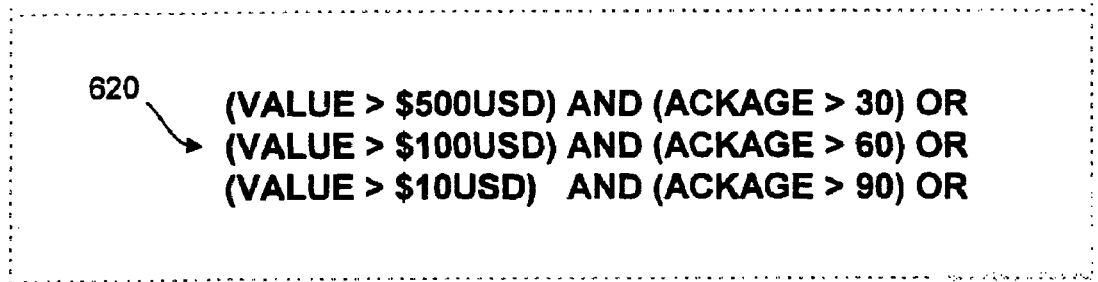

FIGS. 6A-6C illustrate the form of several types of conditional expressions that can be used with thresholds in accordance with embodiments of the present invention. For example, as shown in FIG. 6A, a condition might be:

value>200 USD

This conditional expression contains a target 602, an operator 604, and a limit 606. In this example, a VALUE is being evaluated, and the limit is a currency amount. If an ACKAGE were being evaluated, then the limit might be a time interval, and if a COUNT were being evaluated, the limit would be an integer.

As shown in FIG. 6B, the trigger expression may also contain logical operators 610. In addition, as shown in FIG. 6C, it is possible to have compound trigger conditions, where the trigger expression is represented as a list of lists, and where the contents of each row are logically ANDed, and the rows are logically ORed to form the boolean evaluation of the trigger expression. Referring to FIG. 6C, for example, list 620 specifies that if the consumer's system has not received an acknowledgment from the clearinghouse in the last 30 days, the consumer is allowed to accumulate $500 in deferred payments. If the system has not received an acknowledgment in the last 60 days, the limit is $100. And if the system has not received an acknowledgment in the last 90 days, then the limit is $10.

As indicated previously, when a conditional expression associated with one of a threshold's triggers is satisfied, the threshold is operable to signal transaction processing application 112 to perform a predefined action. An illustrative list of trigger actions is set forth in Table 3.

TABLE 3

| | Types of Actions |
| --- | --- |
| NOTIFY | Notifies the local system application that the condition has been satisfied |
| DELIVER | Delivers audit records to the clearinghouse |
| FAIL | Causes the associated transaction to be aborted |
| FAIL & NOTIFY | Causes the associated transaction to be aborted and notifies the local system application |

Note that both the FAIL and the FAIL & NOTIFY actions cause the transaction to fail (e.g., the user is not given access to the requested content, and is not charged). These actions thus limit the total exposure of the content and/or budget provider by preventing the consumer from accruing additional charges or accumulating additional audit records.

Thresholds are evaluated when transactions occur (such as the purchase of content) and when transaction acknowledgments from a clearinghouse are processed. When a threshold is evaluated, each of its triggers is evaluated. In one embodiment, a trigger fires, or invokes its action, when the trigger condition changes from FALSE to TRUE. Once a trigger fires, it becomes incapable of firing again (i.e., it is "disarmed") until the condition is first changed from TRUE back to FALSE, at which point the trigger is "armed" again, and becomes ready to fire when the condition is satisfied.

Table 4 illustrates the behavior of a threshold in response to a sequence of events. In the example shown in Table 4, the threshold initially has a value of $90, and a trigger condition of:

value>$100.

TABLE 4

| Event | Threshold Value | Result |
|---|---|---|
| Content purchase of $5 | $ 95 | Trigger does not fire (armed, but condition is false). |
| Content purchase of $6 | $101 | Trigger fires (armed and condition is true). |
| Content purchase of $7 | $108 | Trigger does not fire (disarmed and condition is true). |
| Acknowledgment for $10 | $ 98 | Trigger does not fire (armed and condition is false). |
| Content purchase of $3 | $101 | Trigger fires (armed and condition is true). |

The triggers of all of the thresholds associated with a transaction are preferably evaluated as a group in two passes. In the first pass, triggers containing the FAIL or FAIL & NOTIFY actions are evaluated. If any of these triggers fire, the transaction is aborted and no further threshold processing is performed. No values are updated, and it is as if the transaction never occurred. In the second pass, all other triggers are evaluated.

Referring once again to FIG. 4, a more-detailed example of the functionality and use of threshold 514 can now be provided. As shown in FIG. 4, type definition 412 indicates that threshold 514 is an acknowledgment threshold. Thus, as indicated in Table 1, threshold 514's state is updated when audit records are successfully sent to the appropriate clearinghouse. Threshold 514 might initially contain a COUNT of 0. Each time a transaction occurs, the COUNT of threshold 514 is incremented to reflect the number of records generated by the transaction, and the threshold's triggers are evaluated. If, for example, the consumer has accumulated 20 audit records, and attempts to perform a transaction that would result in the twenty-first audit record being stored, conditional expression 402a will evaluate to TRUE and trigger 401a will fire, causing DELIVER action 404a to be executed. The result is that the 20 accumulated audit records are delivered to the clearinghouse (or scheduled to be delivered). The threshold's COUNT is decremented by 20 when an acknowledgment is received from the clearinghouse indicating that the audit records were received/processed. Adjustments might also be made to the threshold's ACKAGE and VALUE variables.

Figure 7:
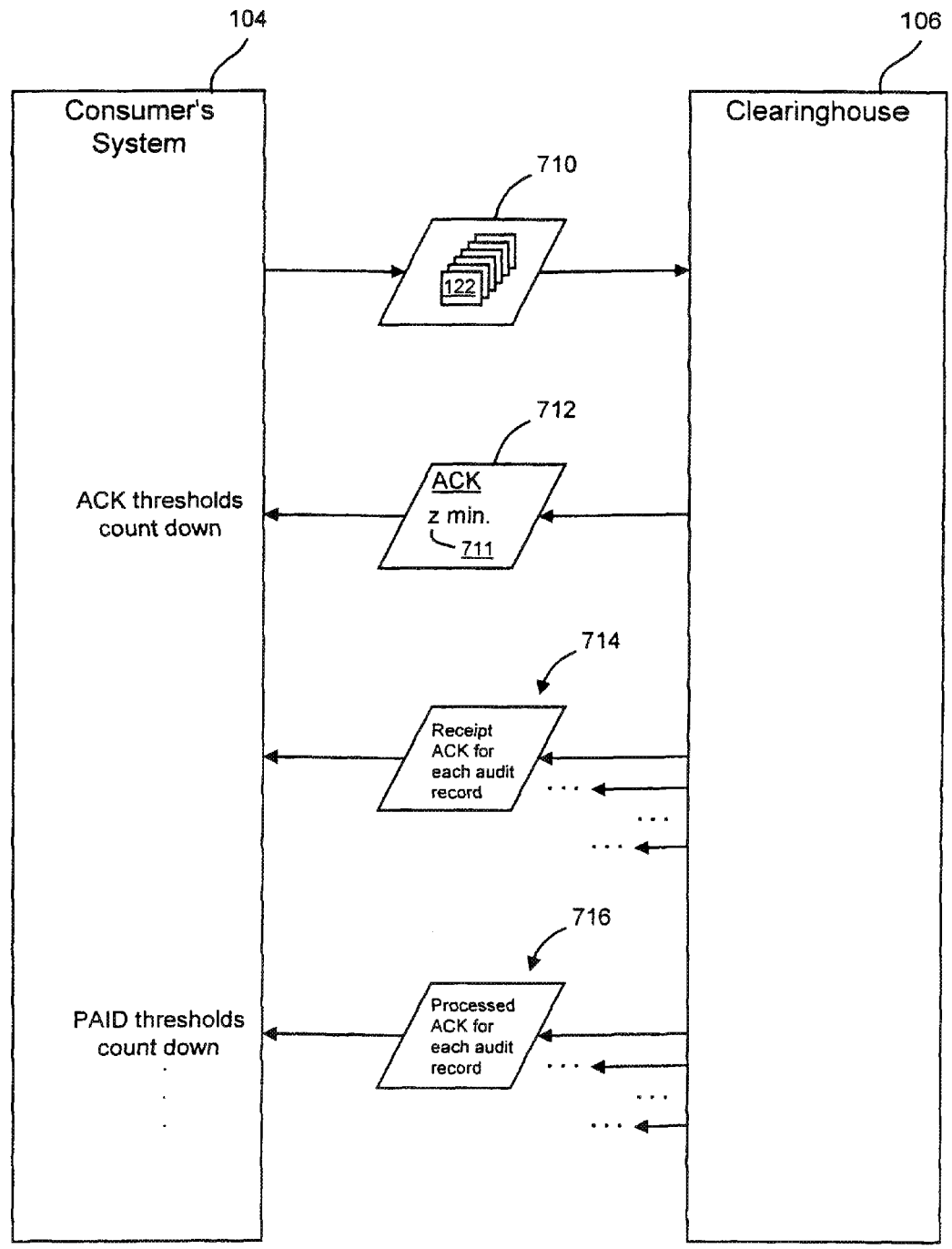
FIG. 7 illustrates the flow of audit records and acknowledgments between a clearinghouse and a consumer's system.

FIG. 7 shows a sequence of acknowledgments sent by clearinghouse 106 to consumer's system 104. When the clearinghouse first receives a set of audit records 710, it sends an acknowledgment 712 to the consumer's system. As shown in FIG. 7, when the consumer's system receives this acknowledgment, it updates the state of the appropriate ACK thresholds. As the clearinghouse opens (e.g., decrypts) each audit record, it sends an acknowledgment 714 to the consumer's system, indicating receipt (which, in some embodiments, the consumer's system may use to update certain thresholds). Later, the clearinghouse sends a second acknowledgment 716 for each audit record, indicating that the audit record has been completely processed and can now be archived or deleted. As shown in FIG. 7, the consumer's system updates the state of the PAID thresholds that correspond to the processed audit records when these acknowledgments 716 are received. Thus, it can be seen that records may go through multiple stages of processing—e.g., receipt, payment initiation, successful payment—at one or more clearinghouses or other destination systems. Each stage may return an acknowledgment that can be used to update a threshold.

In one embodiment, the clearinghouse is also operable, upon receipt of a communication 710 from the consumer's system, to send an indication 711 of when the consumer's system should contact the clearinghouse again to receive the acknowledgments (714, 716) associated with audit records 710. This is useful if, for example, the consumer's system is disconnected from the network or otherwise unreachable when the clearinghouse attempts to send acknowledgments 714 or 716. The consumer's transaction processing application 112 receives the time (or interval) indication 711 and ensures that a connection is made to the clearinghouse a that time (or that an attempt is made at the specified intervals), and/or that the consumer is prompted to make such a connection.

Figure 8:
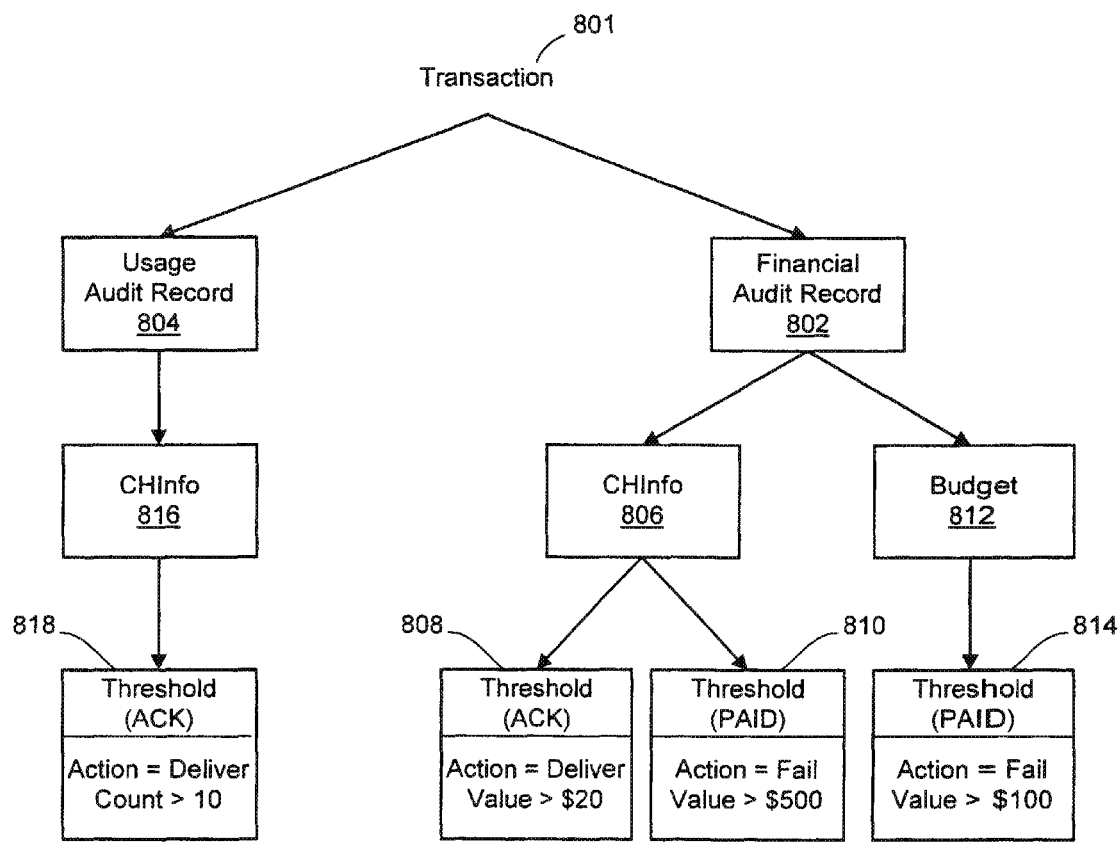
FIG. 8 illustrates the use of thresholds in an electronic transaction in accordance with an embodiment of the present invention.

FIG. 8 further illustrates the use of thresholds in accordance with an embodiment of the present invention. As shown in FIG. 8, transaction 801 (such as purchasing a piece of content) generates two kinds of audit records 802, 804. Audit record 802, refers to CHInfo object 806, which in turn refers to thresholds 808 and 810. Audit record 802 also references a budget object 812, which references threshold 814. Similarly, audit record 804 references CHInfo object 816, which references threshold 818. Table 5 presents a number of illustrative scenarios based on the example arrangement shown in FIG. 8, and describes which triggers would fire under different sets of conditions.

TABLE 5

| IF . . . | AND CONSUMER ATTEMPTS THIS TRANSACTION | WHAT HAPPENS? |
|---|---|---|
| Value of accumulated audit records associated with CHInfo 806 is $5. | Consumer attempts to spend $16. | The trigger for threshold 808 fires and the audit records are delivered. |
| Ten undelivered audit records associated with CHInfo 816 are stored on the consumer's system. | Consumer attempts to spend $5, generating another audit record. | Trigger for threshold 818 fires and the audit records are delivered. |

TABLE 5-continued

| IF... | AND CONSUMER ATTEMPTS THIS TRANSACTION | WHAT HAPPENS? |
|---|---|---|
| Value of accumulated audit records associated with CHInfo 806 is $450. | Consumer attempts to spend $51. | Trigger for threshold 810 fires and the transaction fails. |
| Value of accumulated audit records associated with the budget 812 is $25. | Consumer attempts to spend $76. | Trigger for threshold 814 fires and the transaction fails. |
| Ten undelivered audit records associated with CHInfo 816 are stored on the consumer's system. Value of accumulated audit records associated with budget 812 is $25. | Consumer attempts to spend $76. | Trigger for threshold 814 fires and the transaction fails. Since this trigger is evaluated first and causes the transaction to fail, threshold 818's trigger is not evaluated. |

In the case shown in row 3 of Table 5, the first column states that the total value of the accumulated audit records associated with CHInfo 806 is $450. But threshold 808 says to deliver the audit records when the accumulated total is $20 or more. The situation shown in row 3 might occur, for example, if audit records were not being processed at the clearinghouse for some reason. The additional threshold on CHInfo object 806—i.e., threshold 810—is thus useful because it sets a FAIL limit on the amount of charges a consumer can make before the bills must be paid.

Thus, it can be seen that thresholds provide a mechanism by which vendors, clearinghouses, budget providers, and the like can limit their exposure to the loss of money, content, or transactional information due to malicious attacks or computer malfunctions. Moreover, by using interrelated thresholds or trigger conditions, relatively fine-grained protection can be obtained, since if one threshold or condition is rendered inoperative due to system failures or attacks, other thresholds or conditions may still be operable to govern subsequent transactions.

Although the foregoing invention has been described in some detail for purposes of clarity, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. In a networked computing environment including a first computer system and a second computer system, a method of granting access to a piece of content on the first computer system, the method including:
   sending a request from the first computer system to the second computer system, the request seeking permission to access the content;
   initiating execution of an acknowledgment-monitoring process at the first computer system, the acknowledgment-monitoring process being operable to:
   (a) detect a second acknowledgment from the second computer system, the second acknowledgment indicating that the second computer system received a first acknowledgment from the first computer system; and
   (b) send a third acknowledgment to the second computer system if the second acknowledgment is not received by the first computer system within a predefined time period;
   receiving the request at the second computer system;
   determining whether to grant the request;
   sending a status indicator from the second computer system to the first computer system, the status indicator including an indication that the request has been granted;
   receiving the status indicator at the first computer system and releasing the content to a user;
   sending the first acknowledgment from the first computer system to the second computer system, the first acknowledgment indicating that the content was successfully released to the user;
   receiving the first acknowledgment at the second computer system;
   sending the second acknowledgment from the second computer system to the first computer system;
   receiving the second acknowledgment at the first computer system; and
   terminating execution of the acknowledgment-monitoring process.

2. A method as in claim 1, in which the status indicator further includes a first time value, and in which the first time value is used, at least in part, to measure the predefined time period.

3. A method as in claim 1, in which the predefined time period is measured from the initiation of execution of the acknowledgment-monitoring process.

4. A method for managing a transaction between a first computer system and a second computer system, the method including:
   initiating communication between the first computer system and the second computer system, the communication including a request from the first computer system to the second computer system for authorization to execute the transaction;
   initiating a failure-recovery job at the first computer system, the failure-recovery job being operable to automatically send a status signal to the second computer system if the communication between the first computer system and the second computer system exhibits a predefined fault condition;
   receiving a signal from the second computer system; and
   using the signal to modify a definition of the predefined fault condition.

5. A method as in claim 4, in which the predefined fault condition comprises the first computer system failing to receive within a predefined amount of time a response from the second computer system to a signal from the first computer system.

6. A method as in claim 4, in which the failure-recovery job is further operable to send a second status signal to the second computer system if the communication between the first computer system and the second computer system exhibits a second predefined fault condition.

7. A method as in claim 6, in which the second predefined fault condition comprises the first computer system sending said status signal to the second computer system more than a predetermined number of times without receiving a response to the status signal from the second computer system.

8. A non-transitory computer program product for managing a transaction on a computer system, the computer program product including:
   computer code for sending a request to access a conditionally-accessible piece of content to a remote computer system;
   computer code for receiving a response from the remote computer system to the request;
   computer code for sending a first acknowledgment to the response to the remote computer system;
   computer code for automatically resending the first acknowledgment to the remote computer system if a second acknowledgment is not received from the remote computer system in response to the first acknowledgment and if a predefined condition is satisfied;
   computer code for accepting a signal from the remote computer system and using information contained in the signal to modify the predefined condition; and
   a computer-readable medium for storing the computer codes.

9. A computer program product as in claim 8, in which the predefined condition comprises a predetermined amount of time elapsing from the time that the first acknowledgment was sent to the remote computer system.

10. A computer program product as in claim 8, in which the computer-readable medium is one of: CD-ROM, DVD, MINIDISC, floppy disk, tape, flash memory, RAM, ROM, system memory, hard drive, and optical storage.

* * * * *